United States Patent [19]
Nagai et al.

[11] Patent Number: 5,937,069
[45] Date of Patent: Aug. 10, 1999

[54] COMMUNICATION CONTROLLER

[75] Inventors: Yuka Nagai, Kawasaki; Tadashi Suzuki, Tokyo; Masanori Sakai, Yokohama; Eiji Ohara, Kawasaki; Satoru Kutsuwada, Kawasaki; Satoshi Kaneko, Kawasaki; Yoshinori Abe, Tama, all of Japan

[73] Assignee: Canon Kabushiki Kaisha, Tokyo, Japan

[21] Appl. No.: 08/899,484

[22] Filed: Jul. 18, 1997

Related U.S. Application Data

[63] Continuation of application No. 08/326,308, Oct. 20, 1994, abandoned.

[30] Foreign Application Priority Data

Oct. 28, 1993 [JP] Japan .................................. 5-292666

[51] Int. Cl.⁶ .................................................. H04L 9/00
[52] U.S. Cl. .............................................. 380/49; 380/18
[58] Field of Search ........................................ 380/49, 18

[56] References Cited

U.S. PATENT DOCUMENTS

| | | | |
|---|---|---|---|
| 5,001,750 | 3/1991 | Kato et al. | 380/18 |
| 5,161,192 | 11/1992 | Carter et al. | 380/48 |
| 5,177,788 | 1/1993 | Schanning et al. | 380/23 |
| 5,222,136 | 6/1993 | Rasmussen et al. | 380/18 X |
| 5,251,203 | 10/1993 | Thompson | 370/13.1 |
| 5,333,198 | 7/1994 | Houlberg et al. | 380/49 |
| 5,339,361 | 8/1994 | Schwalm et al. | 380/23 |
| 5,351,136 | 9/1994 | Wu et al. | 380/18 X |

*Primary Examiner*—Gilberto Barrón, Jr.
*Attorney, Agent, or Firm*—Fitzpatrick, Cella, Harper & Scinto

[57] ABSTRACT

A communication controller enables connection between different apparatuses while protecting user's original commands and confidential data. The communication controller has a standardized mode and a user's original mode. By preventing connection with an apparatus which does not have a proper access right in advance, and transmitting data while enciphering the data when the user's original mode is executed, internal information is protected, and the secrecy protection property is not reduced.

44 Claims, 14 Drawing Sheets

COMMUNICATION CONTROLLER

This application is a part continuation of application Ser. No. 08/326,308 filed Oct. 20, 1994 now abandoned.

BACKGROUND OF THE INVENTION

1. Field of the Invention

This invention relates to a communication controller connected to a communication network.

2. Description of the Related Art

In recent communication controllers connected to a LAN (local area network), standardization has progressed so that common communication protocols relating to control methods, operability and the like can be used, and different apparatuses can be connected to each other.

However, while a standardized communication controller has the advantage that different apparatuses can be connected to each other, the communication network is practically opened, and there arise the possibilities of leakage and modification of a user's original commands and confidential data.

SUMMARY OF THE INVENTION

It is an object of the present invention to provide a communication controller which enables connection between different apparatuses while protecting a user's original commands and confidential data.

It is another object of the present invention to provide a communication controller having a standardized mode and a user's original mode, in which connection to an apparatus not having a proper access right is prevented in advance, and internal information is protected and the secrecy protection is not reduced by transmitting data while enciphering the data when the user's original mode is executed.

According to one aspect, the present invention, which achieves these objectives, relates to a communication controller provided between a network and an external apparatus connected to the network, comprising enciphering means for enciphering data, decoding means for decoding the enciphered data, and identification means for identifying whether a communication protocol comprises a standardized mode or a user's original mode when performing communication. When the identification means has identified that the communication protocol comprises the user's original mode, data is transmitted by enciphering the data by the enciphering means. When the enciphered data has been received, the received data is decoded by the decoding means.

According to another aspect, the present invention relates to a communication controller provided between a network and an external apparatus connected to the network, comprising certification means for certifying that a transmission-side apparatus has a proper access right for a reception-side apparatus when exchanging data with a communication apparatus in communication connected to the network, or with the external apparatus.

The foregoing and other objects, advantages and features of the present invention will become more apparent from the following description of the preferred embodiment taken in conjuction with the accompanying drawings.

DESCRIPTION OF THE PREFERRED EMBODIMENT

Figure 1:
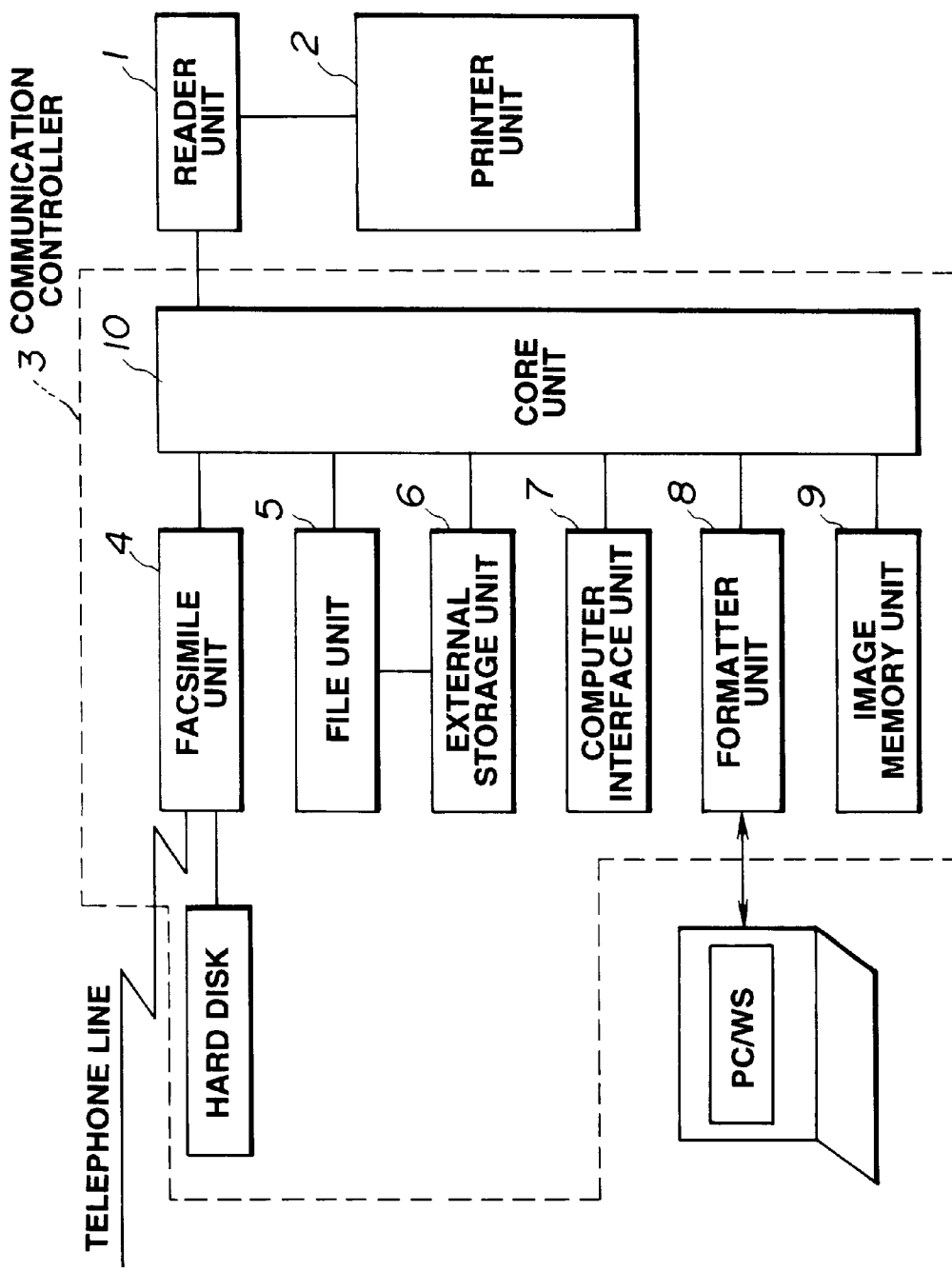
FIG. 1 is a block diagram illustrating the entire configuration of a communication controller according to an embodiment of the present invention.

FIG. 1 is a block diagram illustrating the configuration of a communication controller in a preferred embodiment of the present invention.

As shown in FIG. 1, the system of the embodiment includes an image input device (hereinafter termed a "reader unit") 1 for converting an image of an original into image data, an image output device (hereinafter termed a "printer unit") 2, having cassettes for a plurality of kinds of recording paper, for outputting the image data onto recording paper as a visual image in response to a printing command, and a communication controller 3, having various kinds of functions, electrically connected to the reader unit 1.

The communication controller 3 includes a facsimile unit 4, a file unit 5, an external storage unit 6 connected to the file unit 5, a computer interface unit 7 for connecting a computer, a formatter unit 8 for providing a visual image from information from the computer, an image memory unit 9 for storing information from the reader unit 1, or for temporarily storing information transmitted from the computer, and a core unit 10 for controlling the functions of the respective units. The functions of the respective units will now be described in detail.

Figure 13:
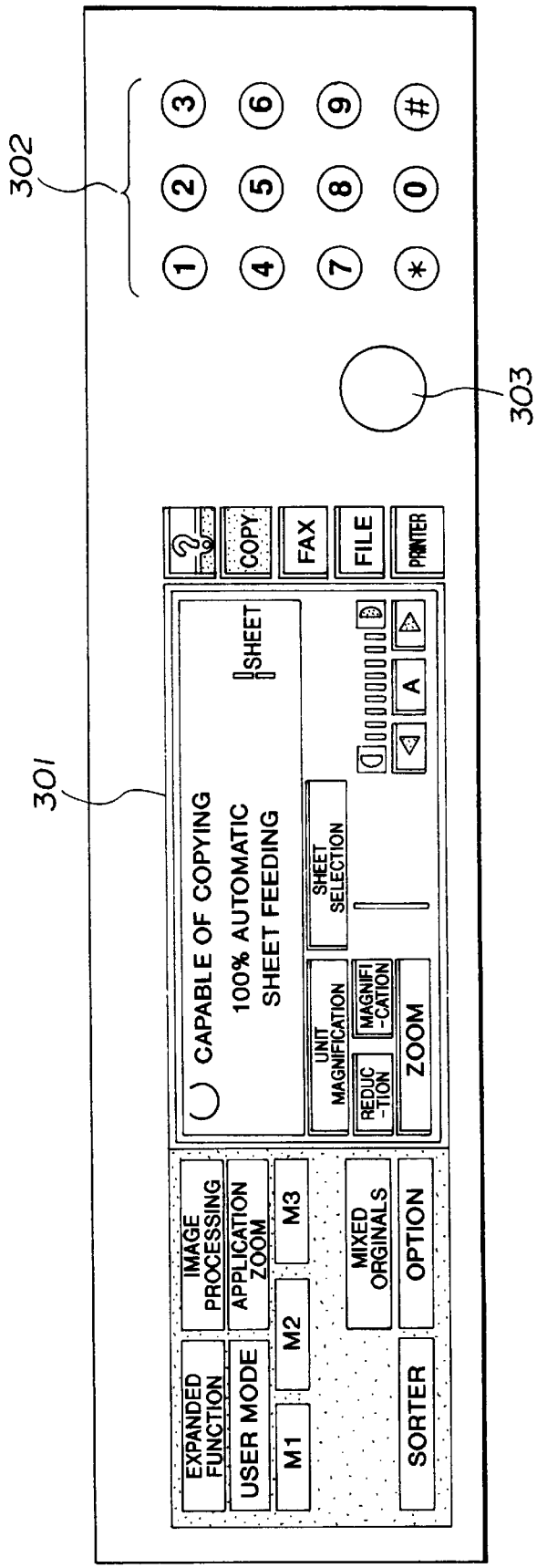
FIG. 13 is a plan view illustrating an operation panel in the embodiment.

FIG. 13 is a plan view illustrating an operation panel provided on the reader unit 1 shown in FIG. 1.

In FIG. 13, a display unit 1301 comprises, for example, an LCD (a liquid-crystal display) for displaying an operational state and a message. Ten keys 1302 are used for inputting various kinds of numerical values. A start key 1303 is used for instructing the start of an operation.

A group registration key 1304 is used for registering a group. By depressing this key, the system is set to a group-registration mode, and the display unit 1301 is switched to a registration picture surface for registering a group to be enciphered, the group consisting of interfaces, addresses or user ID's.

Figure 14:
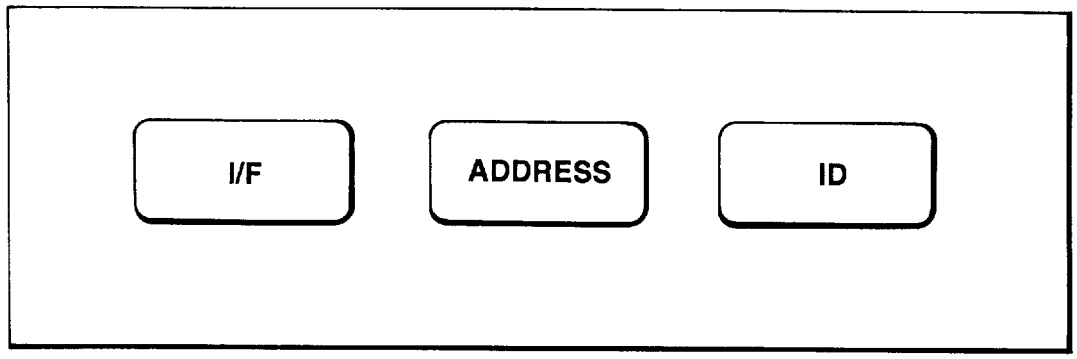
FIG. 14 is a plan view illustrating a picture surface for registering a group in the embodiment.

FIG. 14 is a plan view illustrating a registration picture surface. On this picture surface, by depressing the name of a group to be registered, the necessity or not of an enciphering operation of data in each group during a user's original mode can be newly registered or updated.

In the present embodiment, as shown in FIG. 14, groups of three kinds of items, i.e., interfaces (I/F's), addresses and ID's, can be registered.

In group registration for I/F's, the kinds of interfaces used in each external apparatus (for example, the reader unit 1) to be connected to the communication controller 3 are registered.

In group registration for addresses, addresses of each external apparatus connected to the communication controller 3 are registered. More specifically, for example, the numbers of terminals for connecting the external apparatus are registered.

In group registration for ID's, when using each external apparatus, an ID peculiar to a user of the apparatus input from the user is registered. Various forms of ID's are present depending on the scale of the system and the method of inputting an ID (key input, card input or the like). For example, an ID can be registered by inputting a numerical value from ten keys.

Figure 15:
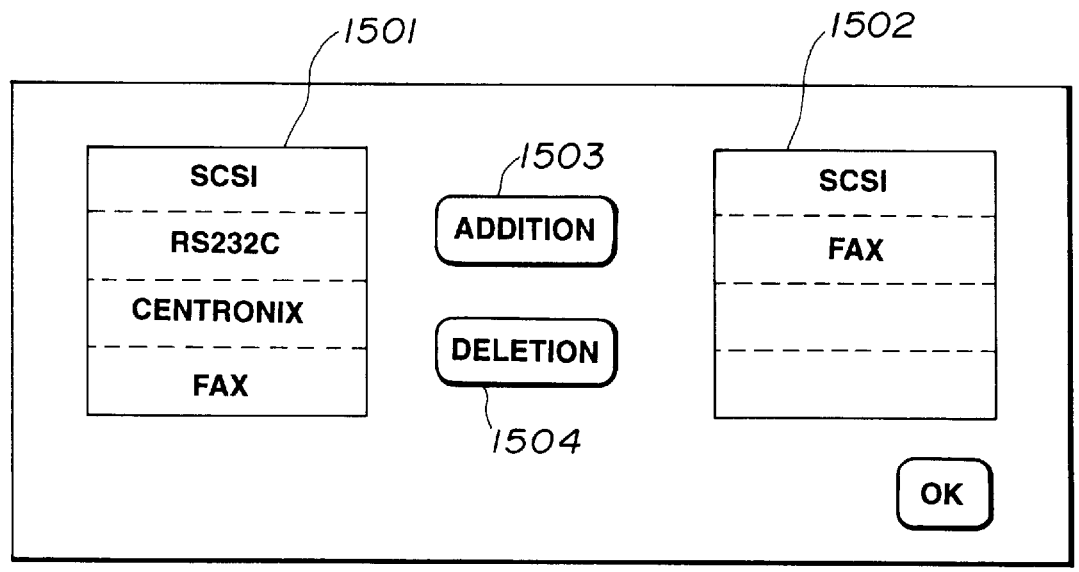
FIG. 15 is a plan view illustrating a picture surface for registering a group of interfaces in the embodiment.

FIG. 15 is a plan view illustrating a registration picture surface for respective interfaces. As described above, by depressing the I/F touch key on the picture surface shown in FIG. 14, this picture surface is obtained.

In FIG. 15, on a region 1501, a table of the kinds of interfaces is displayed, and an interface to be registered in a group is selected from this table. On a region 1502, registered interfaces are displayed.

When it is intended to register a new interface, by depressing an addition key 1503, and depressing the name of an interface to be newly registered within the table region 1501, the interface can be selectively registered from the table region 1501. By depressing a deletion key 1504, and depressing the name of an interface to be deleted within the region 1502, a registered interface can be deleted from the region 1502.

In the above-described group registration for addresses, by depressing the address touch key on the picture surface shown in FIG. 14, a picture surface having a region where for example, a table of the numbers of terminals is present, is displayed. By selectively assigning the number of a terminal to be registered in a group from the table, group regisration is performed. The number of a terminal can be newly registered or deleted in the same manner as in the above-described case of interfaces.

In the group registration for ID's, by depressing the ID touch key on the picture surface shown in FIG. 14, a registration picture surface for ID's is displayed. By inputting a numerical value, for example, from the ten keys 1302, a plurality of ID's are registered. Various methods can be considered for registering an ID. For example, all digits or a certain number of lower digits of an ID for each user may be registered, or a common symbol for each section may be registered.

Data registered in the above-described registration operation are transmitted from the reader unit 1 to the core unit 10 of the controller 3, and are controlled thereafter within the core unit 10.

Figure 2:
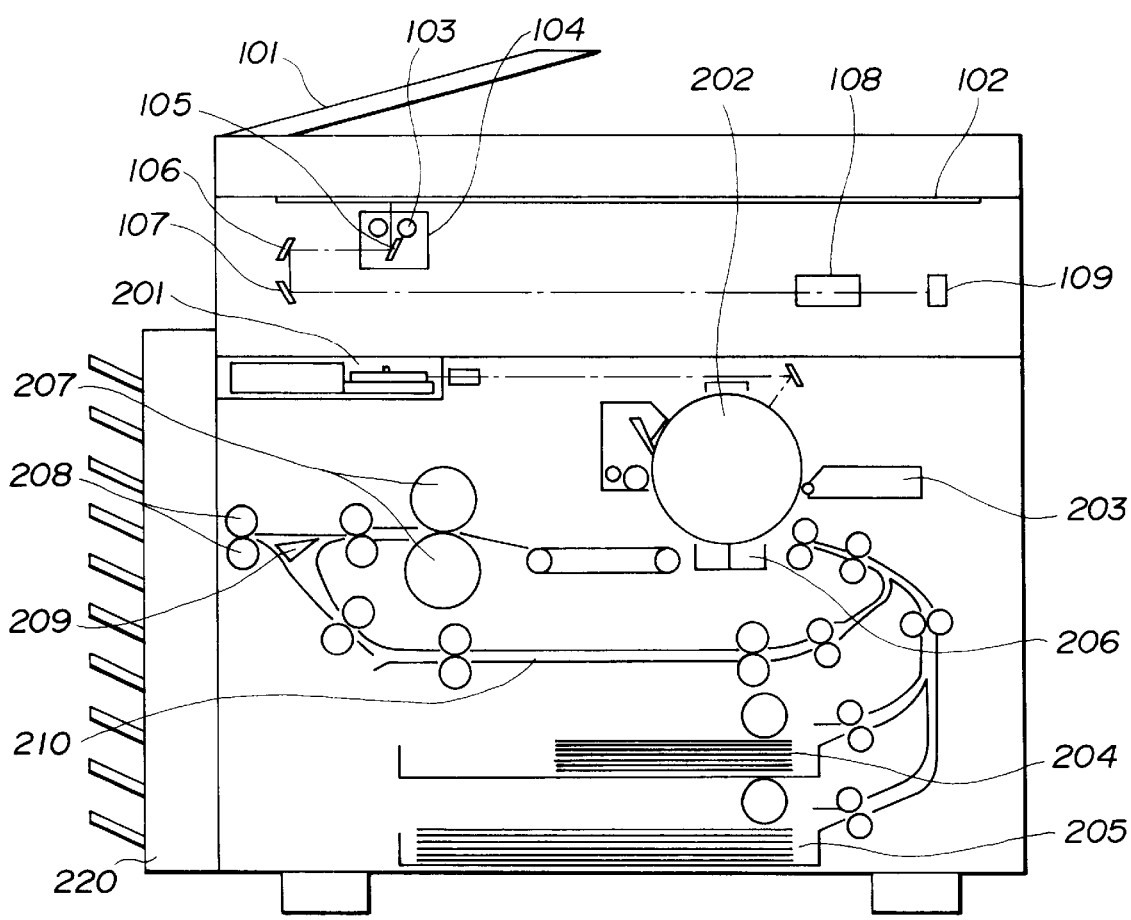
FIG. 2 is a cross-sectional view illustrating the structure of the apparatus shown in FIG. 1.
Figure 3:
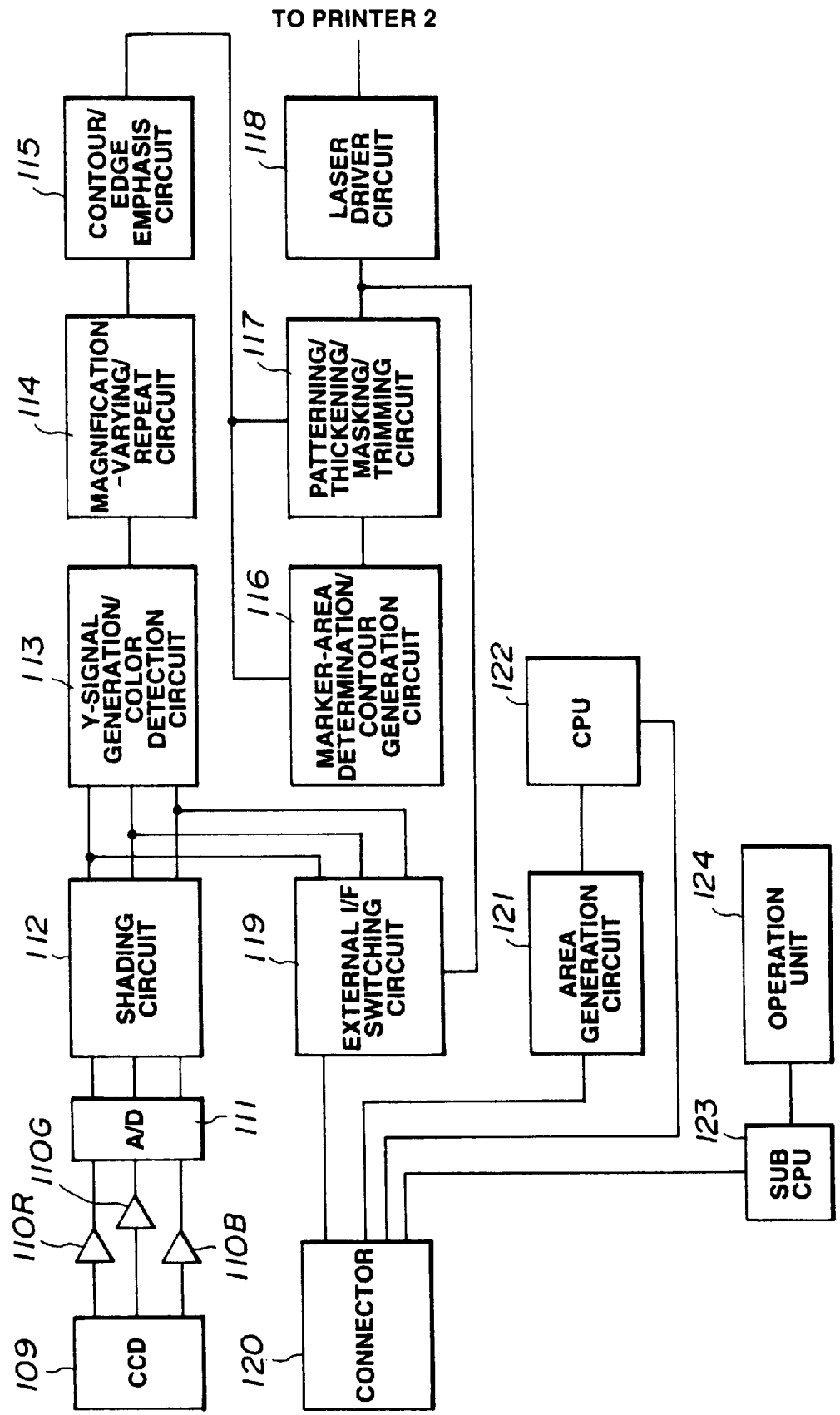
FIG. 3 is a block diagram illustrating the configuration of circuitry of a reader unit and a printer unit shown in FIG. 1.

FIG. 2 is a cross-sectional view illustrating the structure of an image storage/retrieval apparatus according to the embodiment. FIG. 3 is a block diagram illustrating the configuration of the reader unit 1. First, the reader unit 1 will be described in detail with reference to FIGS. 2 and 3.

Originals mounted on an original-feeding device 101 are individually conveyed onto the surface of original-mount glass 102. When an original has been conveyed, the lamp of a scanner unit 103 is lit and a scanner unit 104 moves to illuminate the original. Reflected light from the original passes through a lens 108 via mirrors 105, 106 and 107, and is input to a CCD (charge-coupled device) image sensor (hereinafter termed a "CCD") 109.

Next, image processing within the reader unit 1 will be described in detail with reference to FIG. 3. Image information input to the CCD 109 is subjected to photoelectric conversion into an electrical signal. Color information from the CCD 109 is amplified by amplifiers 110R, 110G and 110B in the following stage so as to be adjusted to the inputsignal level of an A/D converter 111. The output signal of the A/D converter 111 is input to a shading circuit 112, where unevenness in the luminous intensity distribution of the lamp 103, unevenness in the sensitivity of the CCD 109, and the like are corrected. The signal from the shading circuit 112 is input to a Y-signal generation/color detection circuit 113 and an external I/F switching circuit 119.

The Y-signal generation/color detection circuit 113 calculates the signal from the shading circuit 112 using the following expression, to obtain a Y signal.

$$Y=0.3R+0.6G+0.1B.$$

The Y-signal generation/color detection circuit 113 also includes a color detection circuit for obtaining seven colors from R, G and B signals, and outputting signals representing the respective colors. The output signal of the Y-signal generation/color detection circuit 113 is input to a magnification-varying/repeat circuit 114. A magnification-varying operation in the sub-scanning direction is performed by changing the scanning speed of the scanner unit 104, and a magnification-varying operation in the main scanning direction is performed by the magnification-varying/repeat circuit 114. The magnification-varying/repeat circuit 114 can output the same image a plurality of times. A contour/edge emphasis circuit 115 obtains edge emphasis/contour information by emphasizing high-frequency components of the signal from the magnification-varying/repeat circuit 114. The signal from the contour/edge emphasis circuit 115 is input to a marker-area determination/contour generation circuit 116 and a patterning/thickening/masking/trimming circuit 117.

The marker-area determination/contour generation circuit 116 reads a portion of the original written by a marker pen having an assigned color, and generates marker-contour information. The patterning/thickening/masking/trimming circuit 117 performs thickening, masking and trimming from the contour information, and also performs patterning using the color detection signals from the Y-signal generation/color detection circuit 113.

The output signal of the patterning/thickening/masking/trimming circuit 117 is input to a laser driver circuit 118, where various kinds of processed signals are converted into a signal for driving a laser. The signal from the laser driver circuit 118 is input to the printer unit 2, which forms a visual image.

Next, a description will be provided of the external I/F switching circuit 119, serving as an interface with an external apparatus. When outputting image information from the reader unit 1 to the communication controller 3, image information from the patterning/thickening/masking/trimming circuit 117 is output to a connector 120. When the reader unit 1 inputs image information from the communication controller 3, the external I/F switching circuit 119 inputs the image information from the connector 120 to the Y-signal generation/color detection circuit 113.

The above-described image processing operations are performed according to instructions from a CPU (central processing unit) 122. An area generation circuit 121 generates various kinds of timing signals necessary for the image processing operations based on values set by the CPU 122. Communication with the communication controller 3 is performed using a communication function incorporated in the CPU 122. A subCPU 123 controls an operation unit 124, and performs communication with the communication controller 3 using a communication function incorporated in the subCPU 123. The CPU 122 has a function of checking, when performing communication with an external apparatus, if a proper access right is present between the apparatuses in communication. This checking function will be described in detail when describing the core unit 10.

Next, a description will be provided of the printer unit 2.

In FIG. 2, a signal input to the printer unit 2 is converted into a modulated optical signal by an exposure control unit 201, to illuminate a photosensitive member 202 in accordance with the image signal. A latent image formed on the photosensitive member 202 by the illuminating light is developed by a developing unit 203. A sheet of transfer paper is conveyed from a transfer-paper mounting unit 204 or 205, whose timing is adjusted with that of the above-described development, and the developed image is transferred onto the transfer paper by a transfer unit 206. The transferred image is fixed on the transfer paper by a fixing unit 207, and the transfer paper having the fixed image is discharged outside the apparatus through a sheet-discharging unit 208. The transfer paper output through the sheet-discharging unit 208 is discharged onto each bin when a sorting function operates in a sorter 220, and onto the upper-most bin of the sorter 220 when the sorting function does not operate.

Next, a description will be provided of a method of outputting sequentially read images onto one sheet of output paper: The output paper in which an image has been fixed by the fixing unit 207 is first conveyed to the sheet-discharging unit 208. Then, the direction of the paper is inverted, and the paper is conveyed to a unit 210 for mounting transfer paper to be fed back via a conveying-direction switching member 209. When the next original has been prepared, the image of the original is read in the above-described manner. Since the transfer paper is fed from the unit 210 for mounting transfer paper to be fed back, the images of the two originals are formed on the surface and the back of the same output paper.

Next, a description will be provided of the communication controller 3.

The communication controller 3 is connected to the reader unit 1 with a cable, and the core unit 10 within the communication controller 3 controls signals and the functions of the respective units. The communication control unit 3 includes the facsimile unit 4 for performing facsimile transmission and reception, the file unit 5 for converting information of originals into electrical signals and preserving the signals on a magnetooptical disk, the formatter unit 8 for developing code information from the computer into image information, the computer interface unit 7, serving as an interface with the computer, the image memory unit 9 for storing information from the reader unit 1, or temporarily storing information transmitted from the computer, and the core unit 10 for controlling the functions of the above-described respective units.

Figure 4:
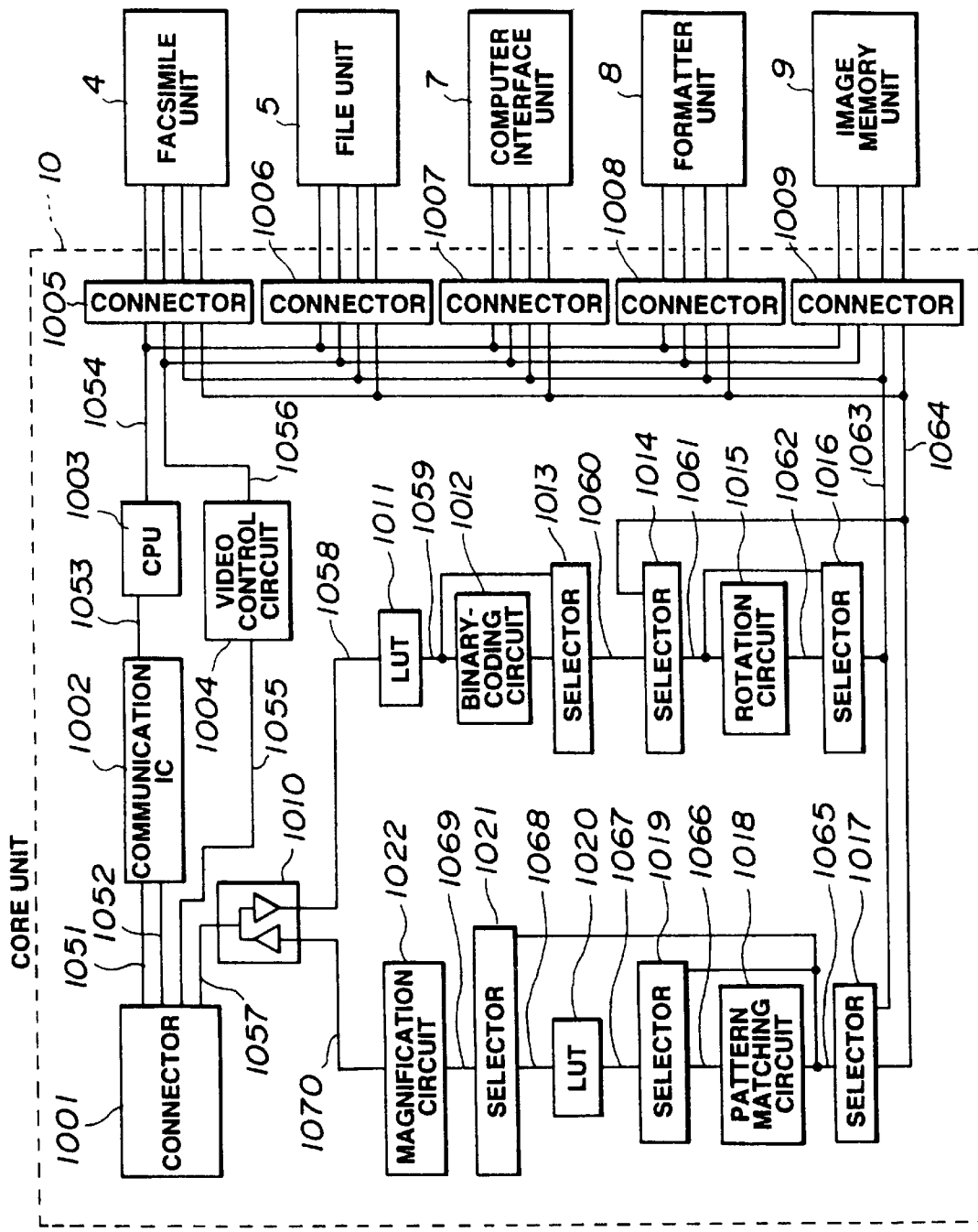
FIG. 4 is a block diagram illustrating the configuration of a core unit shown in FIG. 1.

Next, a description will be provided of the core unit 10 with reference to FIG. 4. A connector 1001 of the core unit 10 is connected to the connector 120 of the reader unit 1 with a cable. In the following description, in order to simplify the description, each signal line and a signal transmitted thereon are indicated by the same reference numeral.

Four kinds of signals are incorporated in the connector 1001. A signal 1057 comprises an 8-bit multivalue video signal. A signal 1055 comprises a control signal for controlling a video signal. A signal 1051 comprises a signal for performing communication with the CPU 122 within the reader unit 1. A signal 1052 comprises a signal for performing communication with the subCPU 123 within the reader unit 1. The signals 1051 and 1052 are subjected to communication protocol processing by a communication IC 1002, and transmit communication information to a CPU 1003 via a CPU bus 1052.

The signal line 1057 comprises a bidirectional video signal line, through which information from the reader unit 1 can be received in the core unit 10, or information from the core unit 10 can be output to the reader unit 1. The signal line 1057 is connected to a buffer 1010, where the bidirectional signal 1057 is divided into unidirectional signals 1058 and 1070. The signal 1058 comprises an 8-bit multivalue video signal from the reader unit 1, and is input to an LUT 1011 in the following stage.

The LUT 1011 converts image information from the reader unit 1 into a desired value using a look-up table. An output signal 1059 from the LUT 1011 is input to a binary-coding circuit 1012 or a selector 1013. The binary-coding circuit 1012 has a simple binary-coding function of performing binary-coding processing of the multivalue signal 1059 with a fixed slice level, a binary-coding function using a variable slice level in which the slice level changes depending on the values of pixels surrounding a target pixel, and a binary-coding function using an error diffusion method.

Binary-coded information is converted into a multivalue signal having values 00H and FFH when the value equals 0 and 1, respectively, and the converted signal is input to the selector 1013 in the following stage. The selector 1013 selects one of the signal from the LUT 1011 and the output signal from the binary-coding circuit 1012. The output signal 1060 from the selector 1013 is input to a selector 1014.

The selector 1014 selects one of a signal 1064, comprising an output video signal from the facsimile unit 4, the file unit 5, the computer interface unit 7, the formatter unit 8, and the image memory 9 input to the core unit 10 via connectors 1005, 1006, 1007, 1008 and 1009, respectively, and the output signal 1060 of the selector 1013, according to an instruction from the CPU 1003. The output signal 1061 of the selector 1014 is input to a rotation circuit 1015 or a selector 1016.

The rotation circuit 1015 has a function of rotating an input image signal by +90 degrees, −90 degrees, or +180 degrees. After the binary-coding circuit 1012 has converted information output from the reader unit 1 into a binary signal, the rotation circuit 1015 stores the converted information. In response to an instruction from the CPU 1003, the rotation circuit 1015 reads the stored information while rotating the information.

The selector 1016 selects one of the output signal 1062 of the rotation circuit 1015 and the input signal to the rotation circuit 1015, and supplies the selected signal to the connector 1005 with the facsimile unit 4, the connector 1006 with the file unit 5, the connector 1007 with the computer interface unit 7, the connector 1008 with the formatter unit 8, the connector 1009 with the image memory unit 9, a selector 1017, as a signal 1063.

The signal line 1063 is a unidirectional synchronous video bus comprising 8 bits for transferring image information from the core unit 10 to the facsimile unit 4, the file unit 5, the computer interface unit 7, the formatter unit 8, and the image memory unit 9. The signal line 1064 is a unidirectional 8-bit synchronous video bus for transferring image information from the facsimile unit 4, the file unit 5, the computer interface unit 7, the formatter unit 8, and the image memory unit 9. A video control circuit 1004 controls the above-described synchronous buses 1063 and 1064. The control is performed by an output signal 1056 from the video control circuit 1004.

A signal line 1054 is also connected to the connectors 1005–1009. The signal line 1054 is a bidirectional 16-bit CPU bus, and performs asynchronous exchange of data and commands. Information transfer with the facsimile unit 4, the file unit 5, the computer interface unit 7, the formatter unit 8, the image memory unit 9 and the core unit 10 can be performed through the above-described two video buses 1063 and 1064 and the CPU bus 1054.

The signal 1064 from the facsimile unit 4, the file unit 5, the computer interface unit 7, the formatter unit 8 and the image memory 9 is input to the selectors 1014 and 1017.

The selector 1017 selects one of the signals 1063 and 1064 according to an instruction from the CPU 1003. The output signal 1065 of the selector 1017 is input to a pattern matching circuit 1018 and a selector 1019. The pattern matching circuit 1018 performs a predetermined pattern matching operation of the input signal 1065, and outputs a predetermined multivalue signal to a signal line 1066 when pattern matching is obtained. If pattern matching is not obtained, the input signal 1065 is output to a signal line 1066.

The selector 1019 selects one of the signals 1065 and 1066 according to an instruction from the CPU 1003. The output signal 1067 of the selector 1019 is input to an LUT 1020 in the following stage.

When outputting image information to the printer unit 2, the LUT 1020 converts the input signal 1067 in accordance with characteristics of the printer.

A selector 1021 selects one of the output signal 1068 of the LUT 1020 and the signal 1065 according to an instruction from the CPU 1003. The output signal of the selector 1021 is input to a magnification circuit 1022 in the following stage.

The magnification circuit 1022 can set the values of magnification independently in the x direction and the y direction according to an instruction from the CPU 1003. The magnification method comprises a one-dimensional linear interpolation method. The output signal 1070 of the magnification circuit 1022 is input to the buffer 1010.

The signal 1070 input to the buffer 1010 becomes a bidirectional signal 1057 according to an instruction from the CPU 1003, and is transmitted to the printer unit 2 via the connector 1001, and the transmitted data is printed.

Figure 10:
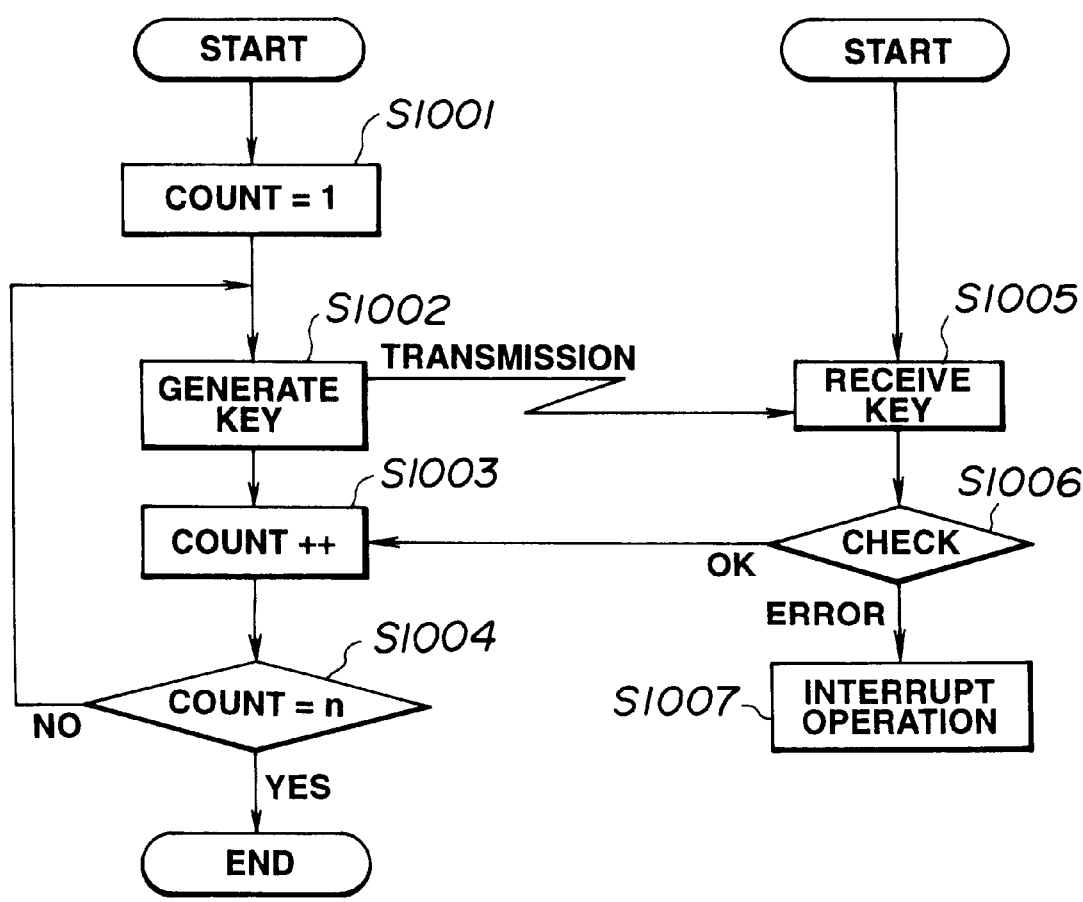
FIG. 10 is a flowchart illustrating a certification operation in the embodiment.

Next, a description will be provided of an operation relating to a method of certifying if the communication controller 3 has a proper access right for the reader unit 1, with reference to the flowchart shown in FIG. 10.

When power has been supplied to the communication controller 3, in step S1001, data, serving as a key, is generated by a key generation function included in the CPU 1003 of the core unit 10. In step S1002, the key is transmitted to the CPU 122 of the reader unit 1.

If the reader unit 1 cannot detect the reception of the key, processing such as interruption of the communication operation, or the like, is performed. When the reception of the key has been detected in step S1005, in step S1006, the CPU 122 checks if the key has been generated by a communication controller having a proper access right.

If the result of the check is affirmative, it indicates that the communication controller has a proper access right, and the communication operation is continued. If the result of the check is negative, the communication operation is prohibited in step S1007.

The CPU 1003 of the communication controller 3 includes a counter for counting the number of checks. When it has been confirmed in step S1004 that checks have been performed a predetermined number (n) of times, the certification processing is terminated.

Although in the present embodiment, a description has been provided of the certification operation between the reader unit 1 and the communication controller 3, the same certification operation may be performed with respect to another communication apparatus connected to the network. This can be realized by the above-described exchange of the key using, for example, an NSF (nonstandard-function identifying) signal, an NSC (nonstandard-function command) signal, or the like during facsimile communication procedures.

Next, a description will be provided of the flow of signals in the respective units of the core unit 10. First, a description will be provided of the operation of the core unit 10 with respect to information of the facsimile unit 4.

When outputting information to the facsimile unit 4, the CPU 1003 performs communication with the CPU 122 of the reader unit 1 via the communication IC 1002, and outputs an original-scanning command. In the reader unit 1, the scanner unit 104 scans the original in response to the command, and outputs image information to the connector 120.

The reader unit 1 and the communication controller 3 are connected to each other with a cable. Information from the reader unit 1 is input to the connector 1001 of the core unit 10. The image information input to the connector 1001 is input to the buffer 1010 via the 8-bit multivalue signal line 1057.

The buffer 1010 inputs the bidirectional signal 1057 to the LUT 1011 via the signal line 1058 as a unidirectional signal according to an instruction from the CPU 1003. The LUT 1011 converts the image information from the reader unit 1 into a desired value using the look-up table. For example, it is possible to skip the background of the original.

The output signal 1059 of the LUT 1011 is input to the binary-coding circuit 1012 in the following stage. The binary-coding circuit 1012 converts the input signal into an 8-bit multivalue signal. The binary-coding circuit 1012 converts the input signal into a multivalue signal having two values 00H and FFH when the binary-coded signal equals 0 and 1, respectively. The output signal of the binary-coding circuit 1012 is input to the rotation circuit 1015 or the selector 1016 via the selectors 1013 and 1014. The output signal 1062 of the rotation circuit 1015 is also input to the selector 1016, which selects one of the signals 1061 and 1062. The selection of the signal is determined by the communication of the CPU 1003 with the facsimile unit 4 via the CPU bus 1054. The output signal 1063 of the selector 1016 is transmitted to the facsimile unit 4 via the connector 1005.

Next, a description will be provided of a case of receiving information from the facsimile unit 4. Image information from the facsimile unit 4 is transmitted to the signal line 1064 via the connector 1005. The signal 1064 is input to the selectors 1014 and 1017.

When outputting an image signal received by facsimile while rotating the signal to the printer unit 2 according to an instruction from the CPU 1003, the signal 1064 input to the selector 1014 is rotated by the rotation circuit 1015. The output signal 1062 of the rotation circuit 1015 is input to the pattern matching circuit 1018 via the selectors 1016 and 1017.

When outputting an image signal received by facsimile to the printer unit 2 without modifying the signal according to an instruction from the CPU 1003, the signal 1064 input to the selector 1017 is input to the pattern matching circuit 1018.

The pattern matching circuit 1018 has a function of smoothing zigzag portions of an image received by facsimile. The signal subjected to pattern matching is input to the LUT 1020 via the selector 1019.

In order to output an image received by facsimile with a desired density from the printer unit 2, the table of the LUT 1020 can be changed by the CPU 1003.

The output signal 1068 of the LUT 1020 is input to the magnification circuit 1022 via the selector 1021. The magnification circuit 1022 magnifies 8-bit multivalues, comprising two values (00H and FFH), by a one-dimensional linear interpolation method. The 8-bit multivalue signal from the magnification circuit 1022 is transmitted to the reader-unit 1 via the buffer 1010 and the connector 1001.

The reader unit 1 inputs this signal to the external I/F switching circuit 119 via the connector 120. The external I/F switching circuit 119 supplies the signal from the facsimile unit 4 to the Y-signal generation/color detection circuit 113. The output signal of the Y-signal generation/color detection circuit 113 is subjected to the above-described processing, and is output to the printer unit 2, where an image is formed on output paper.

Next, a description will be provided of the operation of the core unit 10 with respect to information of the core unit 5.

When outputting information to the file unit 5, the CPU 1003 performs communication with the CPU 122 of the reader unit 1 via the communication IC 1002, and outputs an original-scanning command. In the reader unit 1, the scanner unit 104 scans the original in response to the command, and outputs image information to the connector 120. The reader unit 1 and the communication controller 3 are connected to each other with a cable. Information from the reader unit 1 is input to the connector 1001 of the core unit 10.

Image information input to the connector 1001 becomes a unidirectional signal 1058 by the buffer 1010. The 8-bit multivalue signal 1058 is converted into a desired signal by the LUT 1011. The output signal 1059 of the LUT 1011 is input to the connector 1006 via the selectors 1013, 1014 and 1016. That is, the signal is transmitted to the file unit 5 keeping the form of 8-bit multivalues, without using the functions of the binary-coding circuit 1012 and the rotation circuit 1015.

When performing filing of a binary signal by communication with the file unit 5 via the CPU bus 1054 of the CPU 1003, the functions of the binary-coding circuit 1012 and the rotation circuit 1015 are used. Since the binary-coding processing and rotation processing are the same as in the above-described case of the facsimile unit 4, a description thereof will be omitted.

Next, a description will be provided of a case of receiving information from the file unit 5. Image information from the file unit 5 is input to the selector 1014 or 1017 as a signal 1064 via the connector 1006. In the case of filing an 8-bit multivalue signal, the signal can be input to the selector 1017. In the case of filing a binary signal, the signal can be input to either the selector 1014 or the selector 1017. In the case of filing a binary signal, since the processing is the same as in the case of the facsimile unit 4, a description thereof will be omitted.

In the case of filing a multivalue signal, the output signal of the selector 1017 is input to the LUT 1020 via the selector 1019. The LUT 1020 forms a look-up table in accordance with a desired print density according to an instruction from the CPU 1003.

The output signal 1068 from the LUT 1020 is input to the magnification circuit 1022 via the selector 1021. An 8-bit multivalue signal 1070 obtained by magnifying the signal with a desired magnification by the magnification circuit 1022 is transmitted to the reader unit 1 via the buffer 1010 and the connector 1001. As in the above-described case of the facsimile unit 4, the information of the file unit 5 transmitted to the reader unit 1 is output to the printer unit 2, where an image is formed on output paper.

Next, a description will be provided of the operation of the core unit 10 with respect to information of the computer interface unit 7.

The computer interface unit 7 serves as an interface with the computer connected to the communication controller 3. The computer interface unit 7 includes three kinds of interfaces, i.e., SCSI, RS232C and Centronix. Information from each interface is transmitted to the CPU 1003 via the connector 1007 and the data bus 1054. The CPU 1003 performs various kinds of control based on the transmitted contents.

Next, a description will be provided of the operation of the core unit 10 with respect to information of the formatter unit 8.

The formatter unit 8 has a function of developing command data relating to a document file or the like transmitted from the computer interface unit 7 into image data. When the CPU 1003 has determined that data transmitted from the computer interface unit 7 via the data bus 1054 relates to the formatter unit 8, the data is transferred to the formatter unit 8 via the connector 1008. The formatter unit 8 develops the transferred data in its memory as a visual image.

Next, a description will be provided of procedures of receiving information from the formatter unit 8 and forming an image on output paper. Image information from the formatter unit 8 is transmitted to the signal line 1064 as a multivalue signal, comprising two values (00H, FFH), via the connector 1008. The signal 1064 is input to the selectors 1014 and 1017. The selectors 1014 and 1017 are controlled according to an instruction from the CPU 1003. Since the subsequent processing is the same as in the above-described case of the facsimile unit 4, a description thereof will be omitted.

Next, a description will be provided of the operation of the core unit 10 with respect to information of the image memory unit 9. First, a description will be provided of a case of outputting information to the image memory unit 9.

The CPU 1003 performs communication with the CPU 122 of the reader unit 1 via the communication IC 1002, and outputs an original-scanning command. In the reader unit 1, the scanner unit 104 scans the original in response to the command, and outputs image information to the connector 120. The reader unit 1 and the communication controller 3 are connected to each other with a cable. Information from the reader unit 1 is input to the connector 1001 of the core unit 10. The image information input to the connector 1001 is transmitted to the LUT 1011 via the 8-bit multivalue signal line 1057 and the buffer 1010.

The multivalue image information as the output signal 1059 of the LUT 1011 is transferred to the image memory unit 9 via the selectors 1013, 1014 and 1016, and the connector 1009. The image information stored in the image memory unit 9 is transmitted to the CPU 1003 via the CPU bus 1054 of the connector 1009. The CPU 1003 transfers the data transmitted from the image memory unit 9 to the computer interface unit 7. The computer interface unit 7 transfers the data to the computer using a desired interface from among the above-described three kinds of interfaces (SCSI, RS232C and Centronix).

Next, a description will be provided of a case of receiving information from the image memory unit 9. First, image information is transmitted from the computer to the core unit 10 via the computer interface unit 7. When the CPU 1003 of the core unit 10 has determined that the data transmitted from the computer interface unit 7 via the CPU bus 1054 relates to the image memory unit 9, the data is transferred to the image memory unit 9 via the connector 1009.

Thereafter, the image memory unit 9 transmits the 8-bit multivalue signal 1064 to the selectors 1014 and 1017 via the connector 1009. As in the above-described case of the facsimile unit 4, the output signal from the selector 1014 or 1017 is output to the printer unit 2, where an image is formed on output paper.

Figure 5:
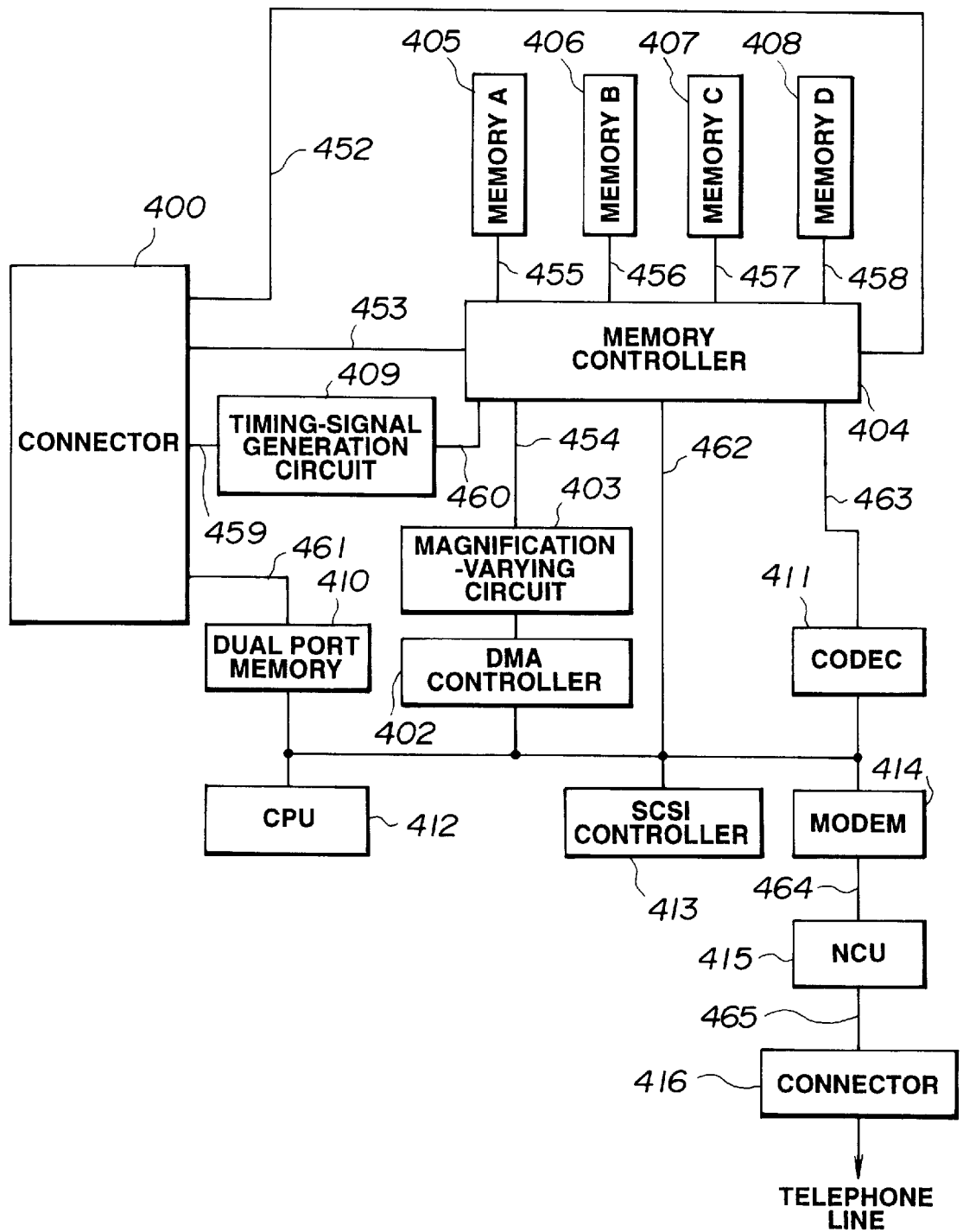
FIG. 5 is a block diagram illustrating the configuration of a facsimile unit shown in FIG. 1.

Next, the facsimile unit 4 will be described in detail with reference to FIG. 5.

The facsimile unit 4 is connected to the core unit 10 with a connector 400, and exchanges various kinds of signals with the core unit 10. when storing binary information from the core unit 10 in any of memories A 405–D 408, a signal 453 from the connector 400 is input to a memory controller 404, and is stored in any of the memories A 405, B 406, C 407 and D 408, or a combination of two of these memories subjected to cascade connection under the control of the memory controller 404.

The memory controller 404 has five functions, comprising a mode of exchanging data between the memories A 405, B 406, C 407 and D 408, and a CPU bus 462 according to instructions from a CPU 412, a mode of exchanging data with a CODEC bus 463 of a CODEC 411 having encoding/decoding functions, a mode of exchanging data between the contents of the memories A 405, B 406, C 407 and D 408, and a bus 454 from a magnification-varying circuit 403 under the control of a DMA controller 402, a mode of storing the binary video input data 454 in any of the memories A 405–D 408 under the control of a timing-signal generation circuit 409, and a mode of reading stored contents from any of the memories A 405–D 408 and outputting the read contents to a signal line 452.

Each of the memories A 405, B 406, C 407 and D 408 has a capacity of 2M (mega) bytes, and stores an image corresponding to the A4 size with a resolution of 400 dpi (dots per inch).

The timing-signal generation circuit 409 is connected to the connector 400 via a signal line 409. The timingsignal generation circuit 409 is started by a control signal (HSYNC, HEN, VSYNC and VEN) from the core unit 10, and generates a signal for achieving the following two functions.

The first function is a function of storing an image signal from the core unit 10 in any one or two of the memories A 405–D 408. The second function is a function of reading data from any of the memories A 405–D 408 and transmitting the read data to the signal line 452.

A dual port memory 410 is connected to the CPU 1003 of the core unit 10 and the CPU 412 of the facsimile unit 4 via signal lines 461 and 462, respectively. Each of these CPU's exchanges commands via the dual port memory 410.

An SCSI controller 413 performs an interfacing operation with a hard disk connected to the facsimile unit 4, and stores data during facsimile transmission or facsimile reception. A CODEC 411 reads image information stored in any of the memories A 405–D 408, encodes the read information by a desired method selected from among the MH, MR and MMR methods, and stores the encoded information in any of the memories A 405–D 408.

The CODEC 411 also reads encoded information stored in the memories A 405–D 408, decodes the read information by a desired method selected from among the MH, MR and MMR methods, and stores the decoded information in any of the memories A 405–D 408 as image information.

A MODEM 414 has a function of modulating encoded information from a hard disk connected to the CODEC 411 or the SCSI controller 413 in order to transmit the information to a telephone line. The MODEM 414 also demodulates information transmitted from an NCU (a network control unit) 415, converts the modulated information into encoded information, and transfers the encoded information to the hard disk connected to the CODEC 411 or the SCSI controller 413.

The NCU 415 exchanges information with a switchboard, directly connected to the telephone line and installed in a telephone central office or the like, with predetermined procedures.

Next, a description will be provided of an operational example in facsimile transmission. A binary image signal from the reader unit 1 is input to the connector 400, passes through the signal line 453, and reaches the memory controller 404. A timing signal for storing the signal 453 in the memory A 405 by the memory controller 404 is generated by the timing-signal generation circuit 409 in response to the timing signal 459 from the reader unit 1.

The CPU 412 connects the memories A 405 and B 406 controlled by the memory controller 404 to the bus line 463 of the CODEC 411. The CODEC 411 reads image information from the memory A 405, encodes the read information by the MR method, and writes the encoded information in the memory B 406. When the CODEC 411 has encoded image information for the A4 size, the CPU 412 connects the memory B 406 controlled by the memory controller 404 to the CPU bus 462.

The CPU 412 sequentially reads the encoded information from the memory B 406, and transfers the read information to the MODEM 414. The MODEM 414 modulates the encoded information, and transmits facsimile information to the telephone line via the NCU 415.

Next, a description will be provided of an operation in facsimile reception. Information transmitted from the telephone line is input to the NCU 415, which connects the facsimile unit 4 to the telephone line with predetermined procedures. The information from the NCU 415 is input to the MODEM 414, which demodulates the information. The CPU 412 stores the inforamtion from the MODEM 414 in the memory C 407 via the CPU bus 462.

When information for one picture surface has been stored in the memory C 407, the CPU 412 connects the data line 457 of the memory C 407 to the line 463 of the CODEC 411 by controlling the memory controller 404. The CODEC 411 sequentially reads encoded information stored in the memory C 407, decodes the read information, and stores the decoded information in the memory D 408.

The CPU 412 performs setting for outputting the image information to the printer unit 2, by which an image is printed, from the memory D 408 via the core unit 10, by performing communication with the CPU 1003 of the core unit 10 via the dual port memory 410. After the setting has been completed, the CPU 412 starts the timing-signal generation circuit 409, to output a predetermined timing signal to the memory controller 404 via the signal line 460.

The memory controller 404 reads the image information from the memory D 408 in synchronization with the signal from the timing-signal generation circuit 409, transmits the read information to the signal line 452, and outputs the information to the connector 400. Since the processing of outputting the information from the connector 400 to the printer 2 has been described with respect to the core unit 4, a description thereof will be omitted.

Figure 6:
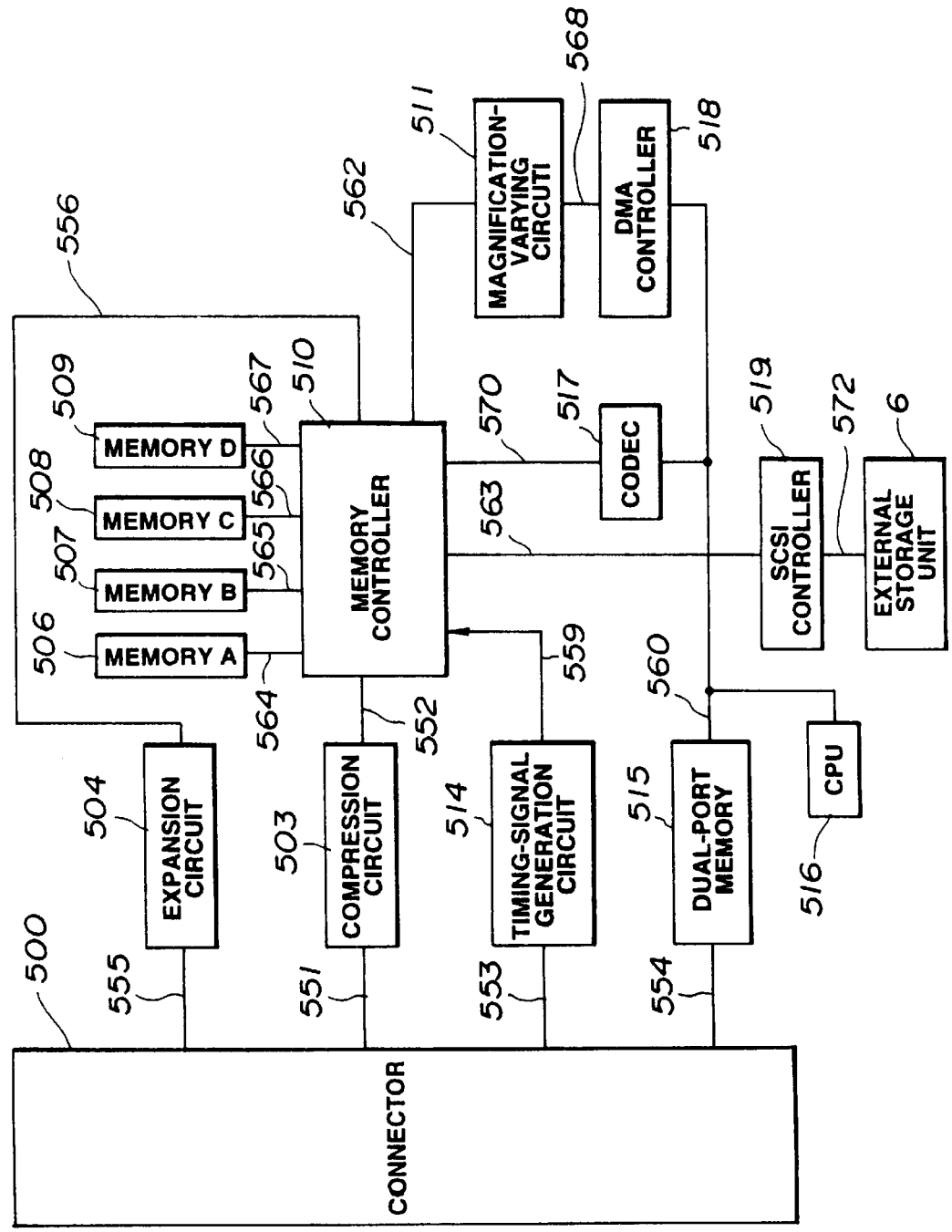
FIG. 6 is a block diagram illustrating the configuration of a file unit shown in FIG. 1.

Next, the file unit 5 will be described in detail with reference to FIG. 6.

The file unit 5 is connected to the core unit 10 with a connector 500, and exchanges various kinds of signals. A multivalue input signal 551 is input to a compression circuit 503, where the multivalue image information is converted into compressed information, which is output to a memory controller 510.

The output signal 552 of the compression circuit 503 is stored in any of memories A 506, B 507, C 508 and D 509, or a combination of two of these memories subjected to cascade connection under the control of the memory controller 510.

The memory controller 510 has five functions, comprising a mode of exchanging data between the memories A 506, B 507, C 508 and D 509, and a CPU bus 560 according to instructions from a CPU 516, a mode of exchanging data with a CODEC bus 570 of a CODEC 517 having encoding/decoding functions, a mode of exchanging data between the contents of the memories A 506, B 507, C 508 and D 509, and a bus 562 from a magnification-varying circuit 511 under the control of a DMA controller 518, a mode of storing the signal 562 in any of the memories A 506–D 509 under the control of a timingsignal generation circuit 514, and a mode of reading stored contents from any of the memories A 506–D 509 and outputting the read contents to a signal line 556.

Each of the memories A 506, B 507, C 508 and D 509 has a capacity of 2M bytes, and stores an image corresponding to the A4 size with a resolution of 400 dpi.

The timing-signal generation circuit 514 is connected to the connector 400 via a signal line 553. The timing-signal generation circuit 409 is started by a control signal (HSYNC, HEN, VSYNC and VEN) from the core unit 10, and generates a signal for achieving the following two functions.

The first function is a function of storing information from the core unit 10 in any one or two of the memories A 506–D 509. The second function is a function of reading data from any of the memories A 506–D 509 and transmitting the read data to the signal line 556.

A dual port memory 515 is connected to the CPU 1003 of the core unit 10 and the CPU 516 of the file unit 5 via signal lines 554 and 560, respectively. Each of these CPU's exchanges commands via the dual port memory 515.

An SCSI controller 519 performs an interfacing operation with the external storage unit 6 connected to the file unit 5. More specifically, the external storage unit 6 comprises magnetooptical disks, and stores data, such as image information and the like.

A CODEC 517 reads image information stored in any of the memories A 506–D 509, encodes the read information by a desired method selected from among the MH, MR and MMR methods, and stores the encoded information in any of the memories A 506–D 509. The CODEC 517 also reads the encoded information stored in the memories A 506–D 509, decodes the read information by a desired method selected from among the MH, MR and MMR methods, and stores the decoded information in any of the memories A 506–D 509 as image information.

Next, a description will be provided of an operation of storing file information in the external storage unit 6. An 8-bit multivalue image signal from the reader unit 1 is input to the connector 500, and is further input to the compression circuit 503 via the signal line 551. The signal 551 is input to the compression circuit 503, and is converted into compressed information 552 therein. The compressed information 552 is input to the memory controller 510.

The memory controller 510 causes the timing-signal generation circuit 514 to generate a timing signal 559 according to the signal 553 from the core unit 10, and stores the compressed signal 552 in the memory A 506 in response to the timing signal 559.

The CPU 516 connects the memories A 506 and B 507 to a bus line 570 of the CODEC 517. The CODEC reads the compressed information from the memory A 506, encodes the read information by the MR method, and writes the encoded information in the memory B 507.

After the CODEC 517 has completed the encoding, the CPU 516 connects the memory B 507 controlled by the memory controller 510 to a CPU bus 560. Thereafter, the CPU 516 sequentially reads the encoded information from the memory B 507, and transfers the read information to the SCSI controller 519. The SCSI controller 519 stores the encoded information in the external storage unit 6.

Next, a description will be provided of an operation of taking out information from the external storage unit 6, and outputting the information to the printer unit 2.

Upon reception of an information retrieval/printing command, the CPU 516 receives the encoded information from the external storage unit 6 via the SCSI controller 519, and transfers the received encoded information to the memory C 508. At that time, the memory controller 510 connects the CPU bus 560 to a bus 566 of the memory C 508 according to an instruction from the CPU 516.

After the transfer of the encoded information to the memory C 508 has been completed, the CPU 516 connects the memories C 508 and D 509 to the bus 570 of the CODEC 517 by controlling the memory controller 510. The CODEC 517 reads the encoded information from the memory C 508, sequentially decodes the information, and transfers the decoded information to the memory D 509.

When a magnification-varying operation, such as magnification or reduction, is needed when outputting data to the printer unit 2, the memory D 509 is connected to the bus 562 of the magnification-varying circuit 511, and the contents of the memory D 509 are subjected to magnification-varying processing under the control of the DMA controller 518. The CPU 516 performs setting for outputting the image information to the printer unit 2, by which an image is printed, from the memory D 509 via the core unit 10, by performing communication with the CPU 1003 of the core unit 10 via the dual port memory 515.

After the setting has been completed, the CPU 516 starts the timing-signal generation circuit 514, to output a predetermined timing signal to the memory controller 510 via the signal line 559. The memory controller 510 reads the decoded information from the memory D 509 in synchronization with the signal from the timing-signal generation circuit 514, and transmits the read information to the signal line 556. The signal 556 is input to an expansion circuit 504, where the information is expanded.

The output signal 555 of the expansion circuit 504 is output to the core unit 10 via the connector 500. Since the processing of outputting the information from the connector 500 to the printer unit 2 has been described with respect to the core unit 4, a description thereof will be omitted.

Figure 7:
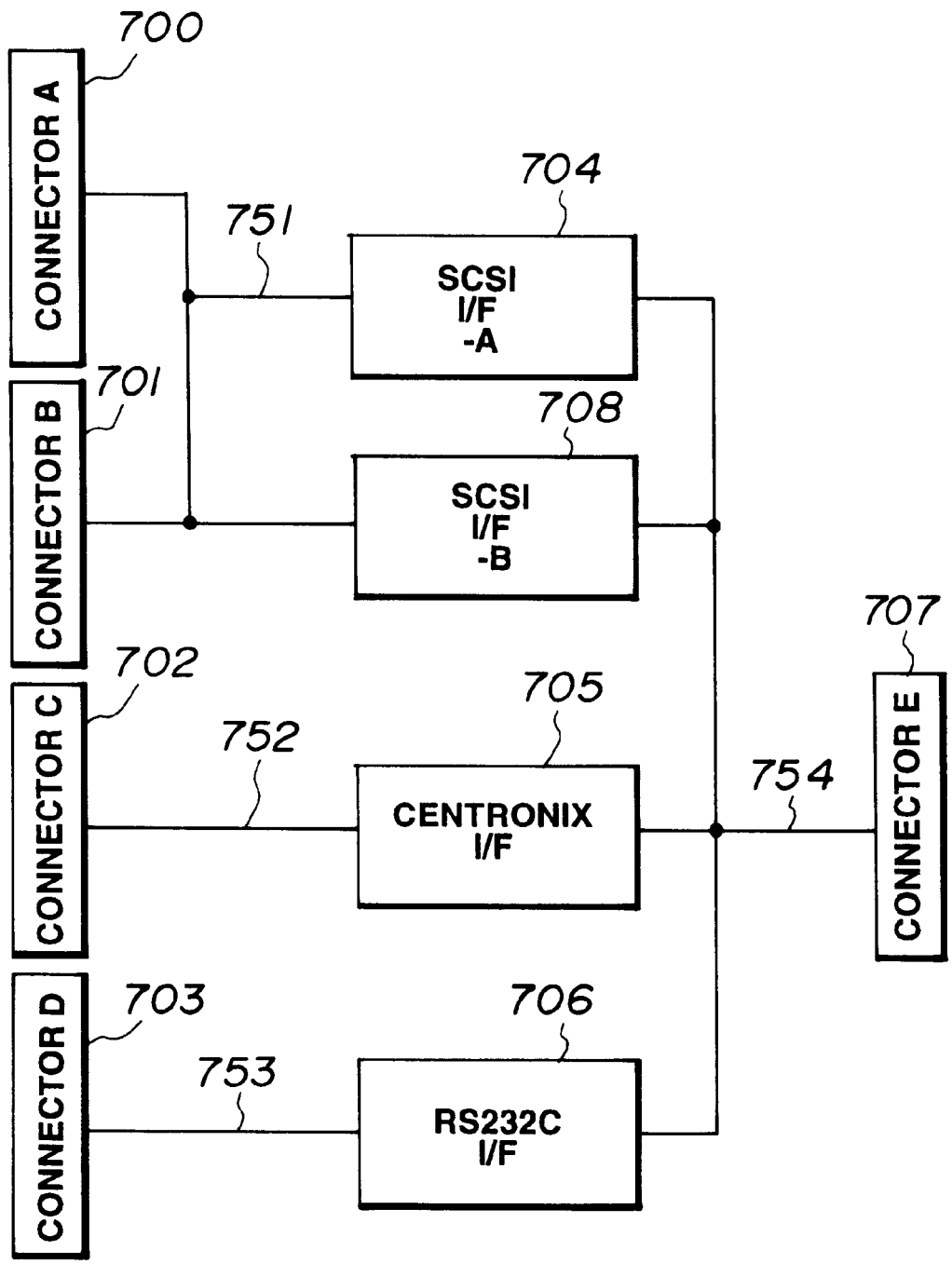
FIG. 7 is a block diagram illustrating the configuration of a computer interface unit shown in FIG. 1.

Next, a description will be provided of the computer interface unit 7 with reference to FIG. 7.

Connectors A 700 and B 701 are connectors for SCSI interfaces. A connector C 702 is a connector for a Centronix interface. A connector D 703 is a connector for an RS232C interface. A connector E 707 is a connector for connecting the computer interface unit 7 to the core unit 10.

An SCSI interface has two connectors (the connectors A 700 and B 701). When connecting an apparatus having a plurality of SCSI interfaces, cascade connection is effected using the connectors A 700 and B 701. When connecting the communication controller 3 only to a computer, the connector A 700 is connected to the computer with a cable, and a terminator is connected to the connector B 701. Alternatively, the connector B 701 is connected to the computer with a cable, and a terminator is connected to the connector A 700.

Information input from the connector A 700 or B 701 is input to an SCSI·I/F-A 704 or an SCSI·I/F-B 708 via a signal line 751. After performing procedures according to an SCSI protocol, the SCSI·IF-A 704 or the SCSI·IF-B 708 outputs data to a connector E 707 via a signal line 754.

The connector E 707 is connected to the CPU bus 1054 of the core unit 10. The CPU 1003 of the core unit 10 receives information input to the connectors for SCSI·I/F's (the connectors A 700 and B 701) from the CPU bus 1054. When outputting data obtained from the CPU 1003 of the core unit 10 to the SCSI connectors (the connectors A 700 and B 701), procedures reverse to the above-described procedures are performed.

A Centronix interface (I/F) 705 is connected to the connector C 702. Data is input to the Centronix I/F 705 via a signal line 752. The Centronix I/F 705 receives data according to predetermined protocol procedures, and outputs data to the connector 707 via the signal line 754.

The connector E 707 is connected to the CPU bus 1054 of the core unit 10. The CPU 1003 of the core unit 10 receives information input to the connector for the Centronix I/F (the connector C 702) from the CPU bus 1054.

An RS232C interface (I/F) 706 is connected to the connector D 703. Data is input to the RS232C I/F 706 via a signal line 753. The RS232C I/F 706 receives data according to predetermined protocol procedures, and outputs data to the connector E 707 via the signal line 754.

The connector E 707 is connected to the CPU bus 1054 of the core unit 10. The CPU 1003 of the core unit 10 receives information input to the connector for the RS232C I/F (the connector D 703) from the CPU bus 1054.

When outputting data obtained from the CPU 1003 of the core unit 10 to the connector for the RS232C I/F (the connector D 703), procedures reverse to the above-described procedures are performed.

Figure 8:
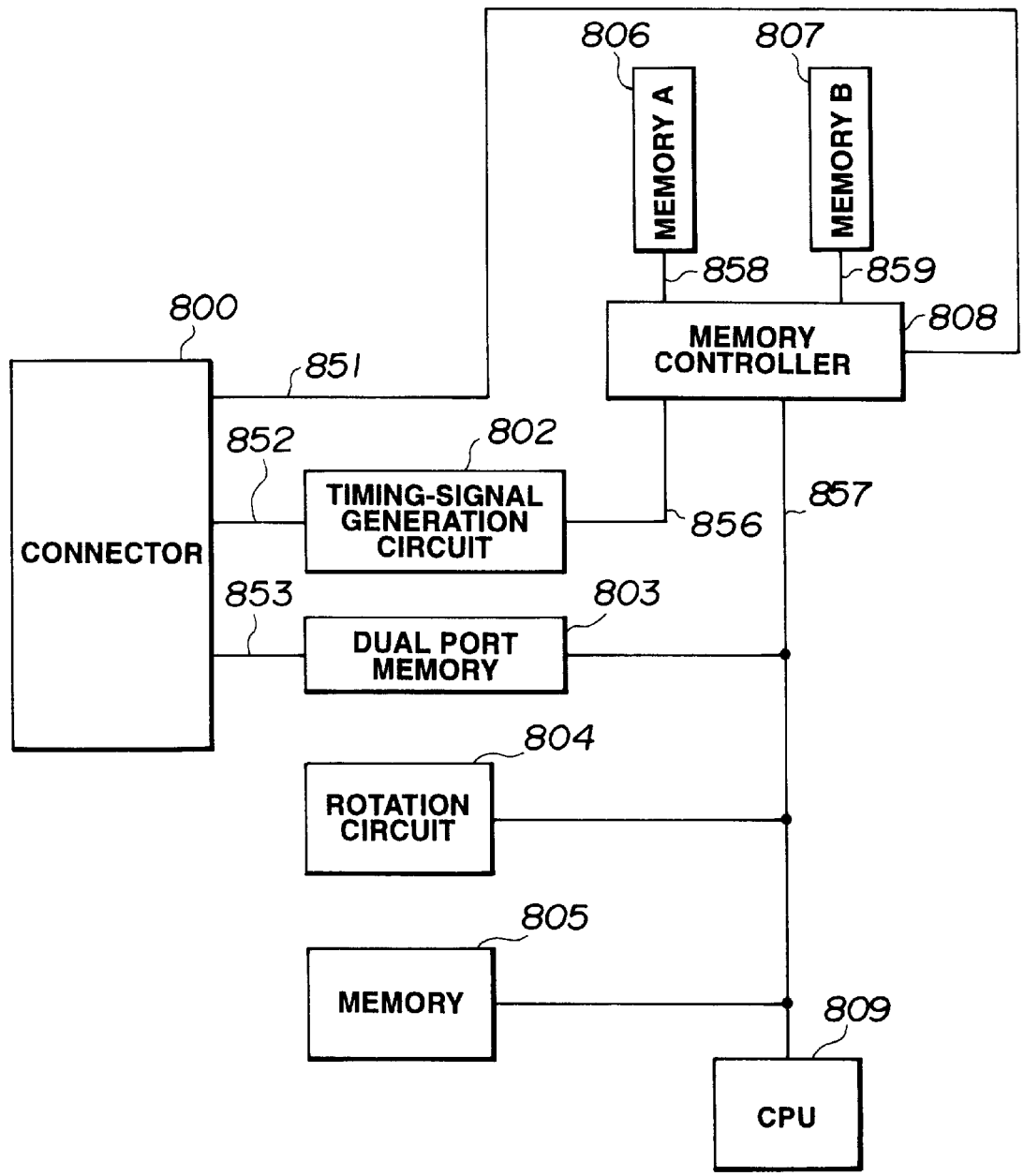
FIG. 8 is a block diagram illustrating the configuration of a formatter unit shown in FIG. 1.

Next, a description will be provided of the formatter unit 8 with reference to FIG. 8.

Data from the computer interface unit 7 is determined by the core unit 10. If the data relates to the formatter unit 8, the CPU 1003 of the core unit 10 transfers the data from the computer to a dual port memory 803 via the connector 1008 of the core unit 10 and a connector 800 of the formatter unit 9.

A CPU 809 of the formatter unit 8 receives the code data transmitted from the dual port memory 803. The CPU 809 sequentially develops this code data into image data, and transfers the image data to a memory A 806 or B 807 via a memory controller 808.

Each of the memories A 806 and B 807 has a capacity of 1M bytes, and can deal with data for the A4 size with a resolution of 300 dpi. When dealing with data for the A3 size with a resolution of 300 dpi, the memories A 806 and B 807 are subjected to cascade connection in order to develop image data therein. The above-described control for the memories is performed by the memory controller 808 according to instructions from the CPU 809.

If rotation of a character, a drawing or the like is needed when developing image data, data is rotated by a rotation circuit 804, and the rotated data is transferred to the memory A 806 or B 807. When the development of the image data has been completed in the memory A 806 or B 807, the CPU 809 connects a data bus line 858 of the memory A 806 or a data bus line 859 of the memory B 807 to an output line 855 of the memory controller 808 by controlling the memory controller 808.

Thereafter, the CPU 809 sets a mode of outputting image information from the memory A 806 or B 807 by performing communication with the CPU 1003 of the core unit 10 via the dual port memory 803. The CPU 1003 of the core unit 10 sets a printing output mode in the CPU 122 by using the communication function incorporated in the CPU 122 of the reader unit 1 via the communication circuit 1002 within the core unit 10.

When the printing output mode has been set, the CPU 1003 of the core unit 10 starts a timing-signal generation circuit 802 via the connector 1008, and the connector 800 of the formatter unit 8. The timing-signal generation circuit 802 generates a timing signal for reading image information from the memory A 806 or B 807 to the memory controller 808 in response to a signal from the core unit 10.

The image information from the memory A 806 or B 807 is input to the memory controller 808 via the signal lines 858 and 859. The image information output from the memory controller 808 is transferred to the core unit 10 via a signal line 851 and the connector 800. Since the processing of outputting data from the core unit 10 to the printer unit 2 has been described with respect to the core unit 10, a description thereof will be omitted.

Figure 9:
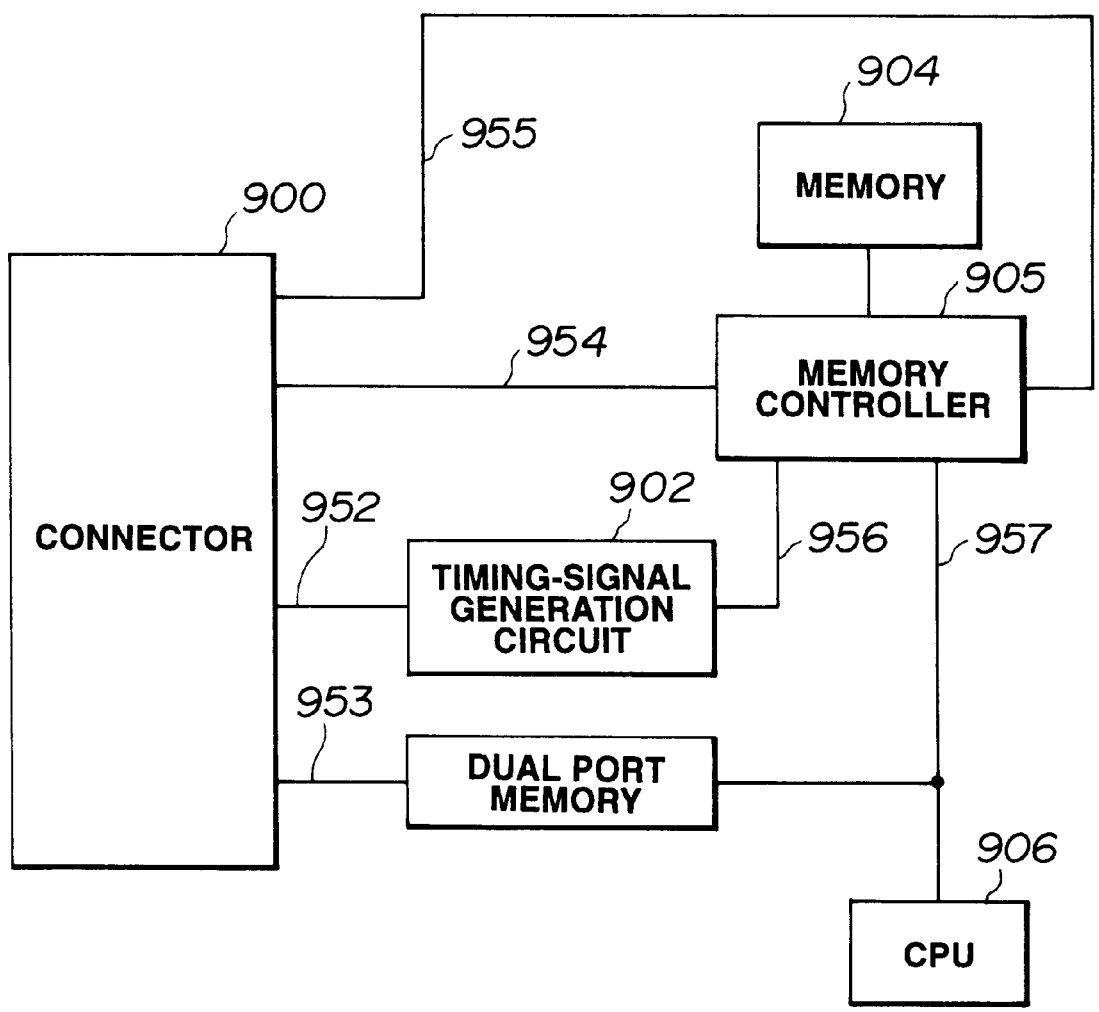
FIG. 9 is a block diagram illustrating the configuration of an image memory unit shown in FIG. 1.

Next, a description will be provided of the image memory unit 9 with reference to FIG. 9.

The image memory unit 9 is connected to the core unit 10 with a connector 900, and exchanges various kinds of signals. A multivalue input signal 954 is stored in a memory 904 unter the control of a memory controller 905.

The memory controller 905 has three functions, comprising a mode of exchanging data between the memory 904 and a CPU bus 957, a mode of storing the signal 954 in the memory 904 under the control of a timing-signal generation circuit 902, and a mode of reading the stored contents from the memory 904 and outputting the read contents to a signal line 955.

The memory 904 has a capacity of 32M bytes, and stores image information for the A3 size with a resolution of 400 dpi and 256 gradation steps. The timing-signal generation circuit 902 is connected to the connector 900 via a signal line 952. The timing-signal generation circuit 902 is started by a control signal (HSYNC, HEN, VSYNC and VEN) from the core unit 10, and generates a signal for achieving the following two functions. The first function is a function of storing information from the core unit 10 in the memory 904. The second function is a function of reading data from the memory 904 and transmitting the read data to the signal line 955.

A dual port memory 903 is connected to the CPU 100 3 of the core unit 10 and the CPU 906 of the image memory unit 9 via signal lines 953 and 957, respectively. Each of these CPU's exchanges commands via the dual port memory 903.

Next, a description will be provided of an operation of storing image information in the image memory unit 9, and transferring the information to the computer.

An 8-bit multivalue image signal from the reader unit 1 is input to the connector 900, and is then input to the memory controller 5 via the signal line 954. The memory controller 905 causes the timing-signal generation circuit 902 to generate a timing signal 956 according to a signal 952 from the core unit 10, and stores the signal 954 in the memory 904 in response to the timing signal 956. The CPU 906 connects the memory 904 controlled by the memory controller 905 to a CPU bus 957.

The CPU 906 sequentially reads image information from the memory 904, and transfers the read information to the dual port memory 903. The CPU 1003 of the core unit 10 reads the image information stored in the dual port memory 903 of the image memory unit 9 via a signal line 953 and the connector 900, and transfers the read information to the computer interface unit 7. Since the processing of transferring the information from the computer interface unit 7 to the computer has already been described, a description thereof will be omitted.

Next, a description will be provided of an operation of outputting image information transmitted from the computer to the printer unit 2.

The image information transmitted from the computer is transmitted to the core unit 10 via the computer interface unit 7. The CPU 1003 of the core unit 10 transfers the image information to the dual port memory 903 of the image memory unit 9 via the CPU bus 1054 and the connector 1009.

At that time, the CPU 906 connects the CPU bus 957 to the bus of the memory 904 by controlling the memory controller 905. The CPU 906 transfers the image information from the dual port memory 903 to the memory 904 via the memory controller 905. After the transfer of the image information to the memory 904 has been completed, the CPU 906 connects the data line of the memory 904 to the signal line 955 by controlling the memory controller 905.

Thereafter, the CPU 906 performs setting for outputting the image information to the printer unit 2, by which an image is printed, from the memory 904 via the core unit 10, by performing communication with the CPU 1003 of the core unit 10 via the dual port memory 903. After the setting has been completed, the CPU 906 starts the timing-signal generation circuit 902, to output a predetermined timing signal to the memory controller 905 via the signal line 956.

The memory controller 905 reads the image information from the memory 904 in synchronization with the signal from the timing-signal generation circuit 902, transmits the read information to the signal line 955, and outputs the information to the connector 900. Since the processing of outputting the information from the connector 900 to the printer unit 2 has been described with respect to the core unit 10, a description thereof will be omitted.

Figure 11:
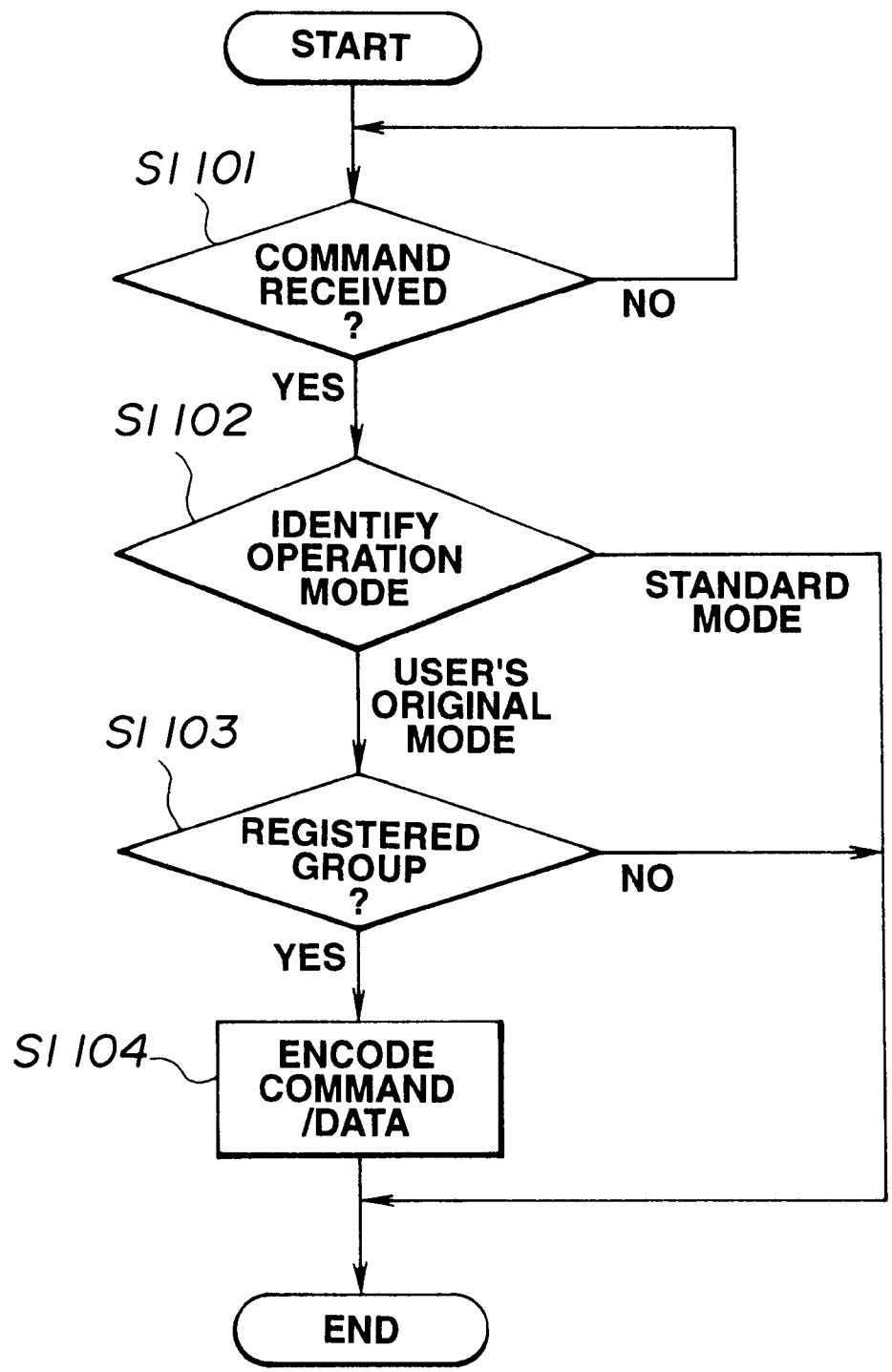
FIG. 11 is a flowchart illustrating an enciphering operation when performing transmission in the embodiment.
Figure 12:
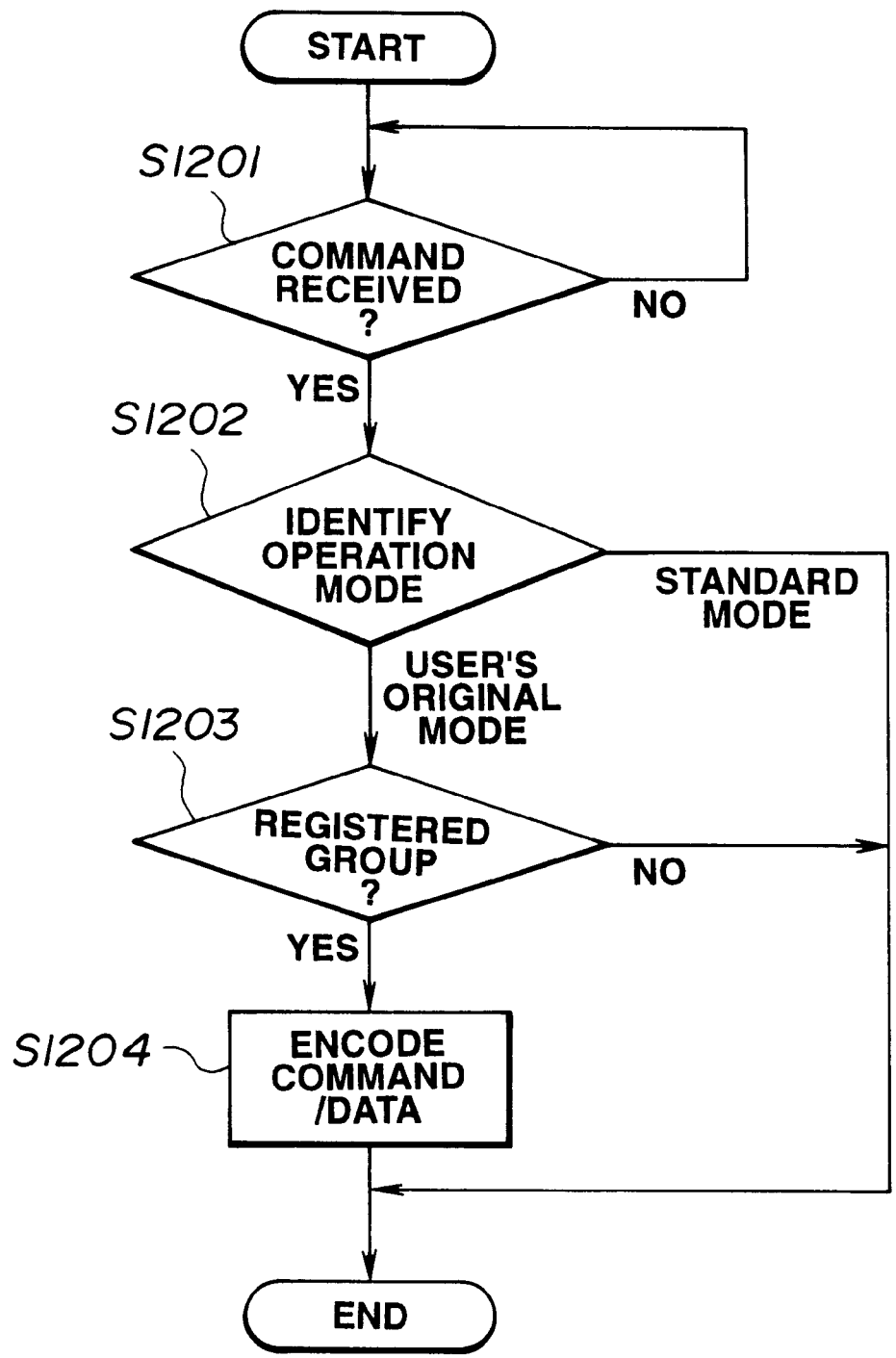
FIG. 12 is a flowchart illustrating a decoding operation when performing reception in the embodiment.

Next, a description will be provided of enciphering and deciphering operations of commands and data, with reference to the flowcharts shown in FIGS. 11 and 12.

First, a description will be provided of operation procedures when transmitting commands and data in facsimile transmission input from the reader unit 1 to another facsimile apparatus connected to the network.

When it has been detected in step S1101 shown in FIG. 11 that a command from the reader unit 1 has been received, the CPU 1003 of the core unit 10 identifies whether the received command comprises a standardized mode or a user's original mode (step S1102). That is, in this identifying operation, it is determined if a specific code for identifying the user's original mode is present in a user region provided in a predetermined region within the command.

When it has been identified that the command comprises the standard mode, the command and data are transmitted without being modified.

When it has been identified that the command comprises the user's original mode, it is determined in step S1103 if the mode corresponds to a registered group. The determination may be performed for one of the above-described registered groups of I/F's, addresses and ID's, or for a combination of two or three of the registered groups under an AND condition or an OR condition.

If the mode does not correspond to a registered group, processing for the standardized mode is performed.

If the mode corresponds to a registered group, the CPU 1003 enciphers the command and data, and transmits the enciphered command and data to the network.

Although in the present embodiment, a description has been provided of the case of performing facsimile transmission from the reader unit 1, the same processing may be performed for other types of communication.

Next, a description will be provided of operation procedures when commands and data enciphered according to the above-described processing have been received from the network.

When it has been detected in step S1201 shown in FIG. 12 that a command has been received, it is identified whether the received command comprises a standardized mode or a user's original mode (step S1202). In order to identify a mode from a command enciphered in the above-described manner, enciphering processing is performed on all the data except for a code for identification, or a special code for identification is newly added during the enciphering processing at the transmission side (step S1104).

If the command comprises a standardized mode, the command is not decoded, and processing corresponding to the contents is performed.

If the command comprises a user's original mode, in step S1203, it is determined if the mode corresponds to a registered group. If the result of the determination is affirmative, in step S1204, the command and data are decoded, and processing corresponding to the contents is performed.

As described above, in the present embodiment, certification by exchanging a key is performed between the communication controller 3 and the reader unit 1, and enciphering processing is performed after identifying the presence of group registration for communication in a user's original mode. Hence, even in a communication controller connected to a practically opened communication network, to which apparatuses of other users can be connected by adopting a standaridized system, leakage of confidential information can be effectively prevented.

As described above, the present invention has a feature in that even in a communication controller connected to a practically opened communication network, internal information can be protected without reducing the originality of communication protocols by performing certification between apparatuses in communication and enciphering commands and data.

The individual components shown in outline or designated by blocks in the drawings are all well known in the communication controller art and their specific construction and operation are not critical to the operation or the best mode for carrying out the invention.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication controller provided between a data processing unit that performs a predetermined data processing and a communication line and is used when the data processing unit performs communication via the communication line, said communication controller comprising:

enciphering means for enciphering data;

receiving means for receiving information which designates a communication mode from the data processing unit; and decision means for deciding whether a communication is to be performed in a first mode which performs communication by enciphering the data or in a second mode which performs communication without enciphering the data in accordance with the information received by said receiving means, wherein data enciphered by said enciphering means is communicated when said decision means decides that communication is to be performed in the first mode, and non-enciphered data is communicated when said decision means decides that communication is to be performed in the second mode.

2. A communication controller according to claim 1, wherein said data processing unit has a reader portion for reading an image and a printer portion for outputting and printing an image, and wherein the transmission of image data read by said reading portion to said printer portion is performed without enciphering the image data.

3. A communication controller provided between a data processing unit that performs a predetermined data processing and a communication line and is used when the data processing unit performs communication via the communication line, said communication controller comprising:

enciphering means for enciphering data;

decoding means for decoding enciphered data;

receiving means for receiving information which designates a communication mode from the data processing unit;

decision means for deciding whether a communication is to be performed in a first mode which performs communication by enciphering the data or in a second mode which performs communication without enciphering the data in accordance with the information received by said receiving means;

communication means for performing enciphered communication by transmitting the data enciphered by said enciphering means and, upon receipt of enciphered data, decoding the received data by said decoding means when said decision means decides that communication is to be performed in the first mode; and controlling means for controlling groups for which a communication is to be performed in the first mode in accordance with the designation by the data processing unit, wherein said communication means, when said deciding means decides to perform the communication in the first mode, performs the enciphered communication to the groups controlled by said controlling means.

4. A communication controller according to claim 3, wherein said controlling means has a function of controlling a group of interfaces connected to said communication controller.

5. A communication controller according to claim 3, wherein said controlling means has a function of controlling a group of addresses of the data processing unit connected to said communication controller.

6. A communication controller according to claim 3, wherein said controlling means has a function of controlling a group of ID information for respective users of the data processing unit connected to said communication controller.

7. A method of controlling a communication controller provided between a data processing unit that performs a predetermined data processing and a communication line and is used when the data processing unit performs communication via the communication line, said method comprising the steps of:

receiving information which designates a communication mode from the data processing unit; and deciding whether the communication is to be performed in a first mode which performs the communication by enciphering the data or in a second mode which performs the communication without enciphering the data in accordance with the information received in said receiving step, wherein enciphered data is communicated when said deciding step decides that communication is to be performed in the first mode, and non-enciphered data is communicated when said deciding step decides that communication is to be performed in the second mode.

8. A controlling method according to claim 7, wherein said data processing unit has a reader portion for reading an image and a printer portion for outputting and printing an image, and wherein the transmission of image data read by said reading portion to said printer portion is performed without enciphering the image data.

9. A method of controlling a communication controller provided between a data processing unit that performs a predetermined data processing and a communication line and is used when the data processing unit performs communication via the communication line, said method comprising the steps of:

receiving information which designates a communication mode from the data processing unit;

deciding whether the communication is to be performed in a first mode which performs the communication by enciphering the data or in a second mode which performs the communication without enciphering the data in accordance with the information received in said receiving step;

communicating by performing either the enciphered communication for which the data is enciphered or the non-encidhered communication for which the data is not enciphered in accordance with the decision taken in said decision step; and controlling groups for which the communication is to be performed in the first mode in accordance with the designation by the data processing unit, wherein said communication step performs the enciphered communication for the groups managed in said controlling step when said decision step decides to perform the communication in the first mode.

10. A controlling method according to claim 9, wherein said controlling step performs control of the groups for respective interfaces each connected to said communication controller.

11. A controlling method according to claim 9, wherein said controlling step performs control of the groups based on addressed of the data processing unit.

12. A controlling method according to claim 9, wherein said controlling step performs control of the groups based on ID information of users of the data processing unit.

13. A data processing unit connected to a communication controller that is provided between said data processing unit and a communication line and is used when said data processing unit performs communication via the communication line, said data processing unit comprising:

interface means for performing transmission and reception of predetermined information with the communication controller; and transmission means for causing the communication controller to perform selectively one of communication of enciphered data by transmitting first information to the communication controller and communication of non-enciphered data by transmitting second, different information to the communication controller.

14. A data processing unit according to claim 13, wherein said data processing units has a reader portion for reading an image and a printer portion for outputting and printing an image, and wherein said transmission means performs transmission of image data read by said reading portion to said printer portion without transmitting the information which designates the communication mode.

15. A method of controlling a data processing unit connected to a communication controller that is provided between the data processing unit and a communication line and is used when the data processing unit performs communication via the communication line, said method comprising the steps of:

transmitting a predetermined command to the communication controller; and causing the communication controller to perform selectively one of communication of enciphered data by adding first information to the command transmitted to the communication controller in said transmitting step and communication of non-enciphered data by adding second, different information to the command transmitted to the communication controller in said transmitting step.

16. A controlling method according to claim 15, wherein said data processing unit has a reader portion for reading an image and a printer portion for outputting and printing an image, and wherein the transmission of the image data read by said reading portion to said printer portion is performed without transmitting the information which designates the communication mode in said transmission step.

17. A communication system comprising:

a data processing unit which performs a predetermined data processing; and a communication controller provided between said data processing unit and a communication line and used when the data processing unit performs communication via the communication line, wherein said data processing unit comprises transmission means for selectively transmitting to said communication controller first information to cause said communication controller to perform communication of enciphered data and second, different information to cause said communication controller to perform communication of non-enciphered data, and wherein said communication controller comprises communication means for selectively performing communication of the enciphered data and the non-enciphered data in dependence on whether information received from said data processing unit is the first information or the second information.

18. A communication system according to claim 17, wherein said data processing unit has a reading portion for reading an image and a printer portion for outputting and printing an image, and wherein the transmission of the image data read by said reading portion to said printer portion is performed without enciphering the image data.

19. A communication system comprising:

a data processing unit which performs a predetermined data processing; and a communication controller provided between said data processing unit and a communication line and used when the data processing unit performs communication via the communication line, wherein said data processing unit comprises transmission means for transmitting communication mode information which designates whether a communication is to be performed in a first mode which performs communication by enciphering the data or in a second mode which performs communication without enciphering the data to said communication controller, and wherein said communication controller comprises enciphering means for enciphering data, receiving means for receiving the communication mode information from the data processing unit, decision means for deciding whether a communication is to be performed in the first mode or in the second mode in accordance with the communication mode information received by said receiving means, communication means for performing enciphered communication by transmitting the data enciphered by said enciphering means when said decision means decides to perform communication in the first mode, and controlling means for controlling groups for which a communication is to be performed in the first mode in accordance with the designation by said data processing unit, and said communication means performs the enciphered communication to the groups controlled by said controlling means when said decision means decides to perform the communication in the first mode.

20. A communication system according to claim 19, wherein said controlling means has a function of controlling a group of interfaces connected to said communication controller.

21. A communication system according to claim 19, wherein said controlling means has a function of controlling a group of addresses of the data processing unit connected to said communication controller.

22. A communication system according to claim 19, wherein said controlling means has a function of controlling a group of ID information for respective users of the data processing unit connected to said communication controller.

23. A communication controller for performing communication with another communication device, said communication controller comprising:

certification means for performing certification in order to determine whether or not said communication controller has a proper access right for the other communication device when said communication controller performs communication;

control means for controlling said certification means to perform certification again when it has certified that said communication controller has a proper access right for the other communication device, and controlling said certification means to stop performing certification when it has certified that said communication controller has no proper access right for the other communication device; and communication means which is enabled to communicate with the other communication device when said certification means has performed a predetermined plural number of certifications that said communication controller has a proper access right for the other communication device.

24. A communication controller according to claim 23, wherein said certification means performs each certification only when a key to start the certification has been transmitted from the other communication device, determines whether said communication controller has a proper access right and interrupts an exchange of data when the key has not been transmitted.

25. A communication controller according to claim 23, wherein said communication controller is connected to a data processing device that performs a predetermined data processing and a network.

26. A communication controller according to claim 23, wherein said communication means performs communication with a communication device connected via a network.

27. A communication controller according to claim 23, wherein said communication means performs communication with a data processing device which is connected to said communication controller and performs a predetermined data processing.

28. A method of controlling a communication controller which performs communication with another communication device, said method comprising the steps of:

performing certification in order to determine whether or not the communication controller has a proper access right for the other communication device when the communication controller performs communication;

controlling said certification step to perform certification again when said certification step has certified that the communication controller has a proper access right for the other communication device, and to stop performing certification when said certification step has certified that the communication controller has no proper access right for the other communication device; and performing communication with the other communication device when a predetermined plural number of certifications that the communication controller has a proper access right for the other communication device are performed in said certification step.

29. A controlling method according to claim 28, wherein said certification step performs each certification only when a key to start the certification has been transmitted from the other communication device, and an exchange of data is interrupted when the key has not been transmitted as a result of determining that the communication controller does not have a proper access right.

30. A controlling method according to claim 28, wherein said communication controller is connected to a data processing device for performing a predetermined data processing and a network.

31. A controlling method according to claim 28, wherein said communication controller performs communication with a communication device connected via a network in said communication step.

32. A controlling method according to claim 28, wherein said communication controller performs communication with a data processing device which is connected to said communication controller and performs a predetermined data processing in said communication step.

33. A communication controller provided between a data processing unit that performs a predetermined data processing and a communication line and is used when the data processing unit performs communication via the communication line, said communication controller comprising:

communication means for selectively performing enciphered communication and non-enciphered communication; and controlling means for controlling information concerning a group for performing enciphered communication, wherein said communication means selectively performs the enciphered communication and the non-enciphered communication in accordance with an enciphered communication command from the data processing unit and the information controlled by said controlling means.

34. A communication controller according to claim 33, wherein the data processing unit has a reading function for reading an image and wherein said communication means performs communication of the image.

35. A communication controller according to claim 33, wherein the data processing unit has a printing function for printing data communicated by said communication means.

36. A communication controller according to claim 33, wherein said controlling means controls the information based on a kind of interface connected between said communication controller and an external apparatus.

37. A communication controller according to claim 33, wherein said controlling means controls the information based on identification information of an external apparatus connected to said communication controller.

38. A communication controller according to claim 33, wherein said controlling means controls the information based on identification information of a user of the data processing unit.

39. A method of controlling a communication controller provided between a data processing unit that performs a predetermined data processing and a communication line and is used when the data processing unit performs communication via the communication line, said method comprising the steps of:

selectively performing enciphered communication and non-enciphered communication; and controlling information concerning a group for performing enciphered communication, wherein said performing step selectively performs the enciphered communication and the non-enciphered communication in accordance with an enciphered communication command from the data processing unit and the information controlled by said controlling step.

40. A method according to claim 39, wherein the data processing unit has a reading function for reading an image and wherein said performing step performs communication of the image.

41. A method according to claim 39, wherein the data processing unit has a printing function for printing data communicated in said performing step.

42. A method according to claim 39, wherein said controlling step controls the information based on a kind of interface connected between the communication controller and an external apparatus.

43. A method according to claim 39, wherein said controlling step controls the information based on identification information of an external apparatus connected to the communication controller.

44. A method according to claim 39, wherein said controlling step controls the information based on identification information of a user of the data processing unit.

* * * * *

UNITED STATES PATENT AND TRADEMARK OFFICE
CERTIFICATE OF CORRECTION

PATENT NO. : 5,937,069

DATED : August 10, 1999

INVENTOR(S) : YUKA NAGAI ET AL.

It is certified that error appears in the above-identified patent and that said Letters Patent is hereby corrected as shown below:

<u>COLUMN 4</u>

Line 20, "inputsignal" should read --input signal--.

<u>COLUMN 5</u>

Line 45, "paper:" should read --paper.--.

<u>COLUMN 6</u>

Line 59, "by+90" should read --by +90--; and
"or+180" should read --or +180--.

<u>COLUMN 11</u>

Line 35, "when" should read --When--.
Line 61, "timingsignal" should read --timing-signal--.

<u>COLUMN 13</u>

Line 43, "timingsignal" should read --timing-signal--.

UNITED STATES PATENT AND TRADEMARK OFFICE
CERTIFICATE OF CORRECTION

PATENT NO. : 5,937,069

DATED : August 10, 1999

INVENTOR(S) : YUKA NAGAI ET AL.

It is certified that error appears in the above-identified patent and that said Letters Patent is hereby corrected as shown below:

COLUMN 17

Line 8, "CPU 100 3" should read --CPU 1003--.

COLUMN 21

Line 17, "addressed" should read --addresses--.
   Line 37, "units" should read --unit--.
   Line 51, "and causing" should read --and ¶ causing--.

Signed and Sealed this

Nineteenth Day of September, 2000

Attest:

Q. TODD DICKINSON

*Attesting Officer*     *Director of Patents and Trademarks*